United States Patent
Okamoto

(10) Patent No.: US 7,818,090 B2
(45) Date of Patent: Oct. 19, 2010

(54) METHOD OF CONTROLLING MOVEMENT OF MOBILE ROBOT

(75) Inventor: Tamao Okamoto, Nishinomiya (JP)

(73) Assignee: Panasonic Corporation, Osaka (JP)

( * ) Notice: Subject to any disclaimer, the term of this patent is extended or adjusted under 35 U.S.C. 154(b) by 1310 days.

(21) Appl. No.: 11/274,207

(22) Filed: Nov. 16, 2005

(65) Prior Publication Data
US 2006/0106496 A1 May 18, 2006

(30) Foreign Application Priority Data
Nov. 18, 2004 (JP) ............... 2004-334573

(51) Int. Cl.
*G05B 19/04* (2006.01)
*G05D 1/00* (2006.01)

(52) U.S. Cl. .................. 700/253; 701/23; 701/26; 700/255

(58) Field of Classification Search .................. 700/253, 700/255; 701/23, 26
See application file for complete search history.

(56) References Cited

U.S. PATENT DOCUMENTS

| | | | | |
|---|---|---|---|---|
| 4,954,962 A | * | 9/1990 | Evans et al. | 701/28 |
| 5,351,056 A | * | 9/1994 | Sawyer | 342/195 |
| 5,363,305 A | * | 11/1994 | Cox et al. | 701/200 |
| 5,569,371 A | * | 10/1996 | Perling | 210/85 |
| 5,911,767 A | * | 6/1999 | Garibotto et al. | 701/28 |
| 6,539,284 B2 | * | 3/2003 | Nourbakhsh et al. | 700/245 |
| 6,760,647 B2 | * | 7/2004 | Nourbakhsh et al. | 700/245 |
| 6,917,855 B2 | * | 7/2005 | Gonzalez-Banos et al. | 700/245 |
| 2004/0073368 A1 | * | 4/2004 | Gonzalez-Banos et al. | 701/301 |
| 2005/0156551 A1 | * | 7/2005 | Takenaka et al. | 318/568.12 |
| 2006/0106496 A1 | * | 5/2006 | Okamoto | 700/253 |

FOREIGN PATENT DOCUMENTS

| | | |
|---|---|---|
| JP | 6-105938 | 4/1994 |
| JP | 6-274223 | 9/1994 |
| JP | 10-172099 | 6/1998 |
| JP | 2003-92749 | 3/2003 |

OTHER PUBLICATIONS

Takumi Munekata et al., entitled "*Intelligent Escort Robot Moving With Human—Fundamental Experiment Using Two Mobile Robots—*", Jun. 7, 2002.

* cited by examiner

*Primary Examiner*—Thomas G Black
*Assistant Examiner*—Wae Louie
(74) *Attorney, Agent, or Firm*—Wenderoth, Lind & Ponack L.L.P.

(57) ABSTRACT

A method of controlling movement of a mobile robot for realizing safe and appropriate accompanying behavior to follow an accompanied target includes detecting at least a position of the accompanied target, and controlling the movement of the mobile robot, based on the detected position of the accompanied target, so that the mobile robot moves along a path that is parallel to a moving direction of the accompanied target.

16 Claims, 17 Drawing Sheets

METHOD OF CONTROLLING MOVEMENT OF MOBILE ROBOT

BACKGROUND OF THE INVENTION

1. Field of the Invention

The present invention relates to a method of controlling movement of a mobile robot, and in particular to a method of controlling movement of a mobile robot which moves along with an accompanied target.

2. Description of the Related Art

Conventionally, there have been introduced various technologies relating to an accompanying method for a mobile robot represented by an automatic cart, an automatic moving vehicle and the like, to follow an accompanied target.

For example, there has been introduced an accompanying method for performing an accompanying behavior by calculating a relative distance and relative velocity between a mobile robot and a leading accompanied target using a wireless device such as an ultrasonic sensor and a wired device such as a lead wire, and by moving the mobile robot to have the relative distance and relative velocity within a predetermined range (e.g. refer to Japanese Laid-Open Patent Applications No. 6-274223, No. 6-105938, and No. 2003-92749).

The conventional mobile robot is described with reference to FIG. 1 and FIG. 2. FIG. 1 is a diagram showing a structure of the conventional mobile robot. FIG. 2 is a diagram showing an accompanying method for use in the conventional mobile robot.

As shown in FIG. 1, a conventional mobile robot 11 is a robot which moves along with an accompanied target 10, and includes: mobile mechanisms 11a such as wheels; a measurement apparatus 11b which detects a relative positional relationship between the mobile robot 11 and the accompanied target 10; a calculator 11c which calculates a path to follow using a measured value by the measurement apparatus 11b; and a control apparatus 11d which controls the mobile mechanisms 11a based on the calculation result by the calculator 11c.

Here, a measurement method by the measurement apparatus 11b for measuring a relative positional relationship between the mobile robot 11 and the accompanied target 10 is described. In Japanese Laid-Open Patent Application No. 6-274223, the measurement apparatus 11b measures a distance to the accompanied target 10 by transmitting and receiving ultrasonic waves and radio waves to/from a transmitting/receiving apparatus attached to the accompanied target 10.

Also, in Japanese Laid-Open Patent Application No. 6-105938, the measurement apparatus 11b measures a distance and a direction to the accompanied target 10 in accordance with a direction of the lead wire connected to the accompanied target 10, and the like.

Further, in Japanese Laid-Open Patent Application No. 2003-92749, the measurement apparatus 11b measures the direction of the accompanied target 10 by detecting a direction of radio waves transmitted from a portable radio wave transmitter equipped to the accompanied target 10.

In the methods described above, the accompanying movement of the mobile robot 11 to follow the accompanied target 10 is controlled as shown in FIG. 2, based on a measured value obtained by measuring a relative positional relationship between an accompanied target 10 and the mobile robot 11 through wired or wireless means. In FIG. 2, it is assumed that the mobile robot 11 has a positional relationship with the accompanied target 10 as indicated by a straight line 12, and moves at a moving velocity $V_T$. Herein, the accompanying behavior is performed by the control apparatus 11d of the mobile robot 11 which controls the mobile mechanisms 11a so that the mobile robot 11 moves at an accompanying velocity $V_R$ toward a same direction as the accompanied target 10, or so that the distance to the accompanied target 10 becomes constant in some cases.

Furthermore, Japanese Laid-Open Patent Application No. 10-172099 discloses a technology relating to a control of an automatic moving vehicle which moves along a moving path of an accompanied target (a leading vehicle).

An example of the case where the control method of the automatic moving vehicle is applied to the mobile robot is described with reference to FIG. 3 and FIG. 4. Here, FIG. 3 is a diagram showing a structure of the mobile robot. FIG. 4 is a diagram showing an accompanying method for use in the mobile robot. Note that, the same reference numbers denote the same constituents as of the mobile robot 11 shown in FIG. 1, and the detailed explanations thereof are omitted here.

As shown in FIG. 3, a mobile robot 21 is a robot which moves along with an accompanied target 10, and includes: mobile mechanisms 11a such as wheels; a measurement apparatus 11b which detects a relative positional relationship between the mobile robot 21 and the accompanied target 10; a path database 11e in which the measured value from the measurement apparatus 11b is stored as information of a moving path 13; a calculator 11c which calculates a path to be followed by the mobile robot 11 itself from the path information of the accompanied target 10 stored in the path database 11e; and a control apparatus 11d which controls the mobile mechanisms 11a based on the calculation result by the calculator 11c.

As shown in FIG. 4, the mobile robot 21 moves along with the accompanied target 10 which moves at a moving velocity $V_T$. For example, when the accompanied target 10 moves on the moving path 13, the mobile robot 21 controls itself so that it moves along the moving path 13 at an accompanying velocity $V_R$, and follows the accompanied target 10. In particular, the technology disclosed in Japanese Laid-Open Patent Application No. 10-172099 realizes a high-precision accompanying behavior by estimating a path for the mobile robot 21 in a current moving condition compared to the moving path 13 of the accompanied target 10, and by controlling the movement so as to correct the difference between the paths.

However, in the case where the conventional technology is applied to the mobile robot, there are the following problems.

In other words, in the conventional technology, the accompanying behavior is performed so as to follow the current accompanied target or its moving path. Accordingly, this results in the mobile robot following behind the accompanied target. Therefore, when the accompanied target suddenly stops, there is a possibility that a collision with the accompanied target will occur due to a delay of braking by the robot.

Additionally, in the case where the accompanied target is a person, in order to check an accompanying condition of the mobile robot positioned behind the person, the checking must be done by turning around the neck or the body so that the checking procedure requires significant effort in labor and time. Also, there is a possibility that an accident will be caused by the person when turning to check the mobile robot.

The aforementioned problems of the conventional technology are described with reference to FIG. 5 and FIG. 6. Here, FIG. 5 is a diagram showing an example relating to a collision with the accompanied target. FIG. 6 is a diagram showing an example relating to the checking of the accompanying condition of the mobile robot.

For example, as shown in FIG. 5, in an ordinary accompanying condition, the mobile robot 11 (21) is positioned behind the accompanied target 10 and moves in a direction toward the accompanied target 10. Here, when the accompanied target 10 suddenly stops, there is a possibility that the mobile robot 11 (21) will collide with the accompanied target 10 positioned forward because of the delay of braking by the mobile robot 11 (21) if sufficient braking is not applied.

Further, as shown in FIG. 6, in the case where the accompanied target 10 is a person that checks the mobile robot 11 (21) which follows behind, the person needs to turn his/her neck around until he/she can view the area behind or to turn his/her body around so as to face the mobile robot. Herein, there is a possibility that an accidental collision with an obstacle 51 on the way will occur because the person only cares about checking the mobile robot 11 (21) positioned behind.

SUMMARY OF THE INVENTION

An object of the present invention is to solve the aforementioned problems and to provide a method of controlling movement of a mobile robot in order to realize safe and appropriate accompanying behavior when following an accompanied target.

A method of controlling movement of a mobile robot according to the present invention includes: detecting at least a position and a direction of an accompanied target; and controlling the movement of the mobile robot, based on the detected position of the accompanied target, so that the mobile robot moves along a path that is directed toward the same direction as a moving direction of the accompanied target and is parallel to the moving direction.

According to this structure, the mobile robot moves together with the accompanied target. Therefore, even in the case where the accompanied target suddenly stops, the mobile robot does not collide with the accompanied target. Also, since the mobile robot moves together with the accompanied target, in the case where the accompanied target is a person, the person can always check the presence of the mobile robot from the surrounding atmosphere. Consequently, a collision between the person and an obstacle on his/her moving direction caused by paying undue attention to checking the mobile robot is no longer caused. Therefore, a safe and appropriate accompanying behavior when following the accompanied target can be realized.

It is preferred that the detecting further includes smoothing at least the detected position of the accompanied target. Also, the controlling may further include estimating a continuous region having a constant width in a direction vertical to the path of the accompanied target, based at least on the position of the accompanied target, and keeping the moving path of the mobile robot while the accompanied target moves within the continuous region. Additionally, the controlling may further include maintaining the moving path of the mobile robot while the accompanied target moves within the continuous region and an angle between the moving direction of the accompanied target and the path of the accompanied target is within a predetermined range.

In the case where the precision of detecting the position and velocity of the accompanied target varies, the above structure can prevent the mobile robot from moving depending on the variations.

It is further preferred that the controlling also includes stopping the mobile robot in the case where the velocity of the accompanied target is 0 and the distance between the accompanied target and the mobile robot is within a predetermined distance.

Thus, instead of making the mobile robot stop when the accompanied target stops, the mobile robot is kept moving even when the accompanied target stops and is stopped when the mobile robot approaches the accompanied target. Therefore, even in the case where the accompanied target repeats stopping and moving, a delay of the mobile robot to follow the accompanied target is limited to the minimum.

It is further preferred that the controlling also includes stopping the mobile robot in the case where it is detected that the moving direction of the accompanied target changes to a direction approaching the mobile robot. Additionally, the controlling further includes re-starting the movement of the mobile robot in the case where it is judged that the accompanied target is moving away from the stopped mobile robot.

Even in the case where the accompanied target makes a U-turn and passes in front of the mobile robot, a collision between the accompanied target and the mobile robot can be avoided.

It is further preferred that the controlling also includes causing the mobile robot to follow after the accompanied target in the case where an obstacle is detected in the moving direction of the mobile robot.

Since there is no obstacle after the accompanied target has passed, the mobile robot can avoid the obstacle.

It is further preferred that the controlling also includes controlling the movement of the mobile robot by making a distance between the accompanied target and the mobile robot shorter when the surrounding environment is more crowded. The possibility of causing a collision with other objects is lower and safer as the mobile robot is closer to the accompanied target. Therefore, in the case where the surrounding environment is crowded, the movement of the mobile robot can be safely controlled by making the distance between the accompanied target and the mobile robot shorter.

It is further preferred that the controlling also includes determining a distance between the accompanied target and the mobile robot in proportion to the moving velocity of the accompanied target, and controlling the movement of the mobile robot in accordance with the distance.

In the case where the moving velocity of the accompanied target is slow, the probability of colliding with the accompanied target is low even when the mobile robot is moved closer to the accompanied target, so that there is no problem when making the distance shorter. However, the possibility of causing a collision between them is higher as the moving velocity of the accompanied target is higher. Therefore, by controlling the distance as described above, the probability of causing a collision can be lowered and safe movement control of the mobile robot can be performed.

Note that, the present invention can be realized not only as a method of controlling the movement of the mobile robot including such characteristic steps, but also as a mobile robot having the characteristic steps included in the method of controlling the movement of the mobile robot as units, and as a program for causing a computer to execute the characteristic steps included in the method of controlling the movement of the mobile robot. Also, it is obvious to say that such program can be distributed through a recording medium such as a Compact Disc-Read Only Memory (CD-ROM), and a communication network such as the Internet.

According to the accompanying method of the present invention, even in the case where the accompanied target suddenly changes its moving velocity, an appropriate accompanying behavior when following the accompanied target in accordance with an accompanied target and an environment can be performed while preventing a collision with the accompanied target.

As further information regarding the technical background of this application, the disclosure of Japanese Patent Application No. 2004-334573 filed on Nov. 18, 2004 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DETAILED DESCRIPTION OF THE PREFERRED EMBODIMENTS

Hereafter, embodiments of the present invention are described with reference to the drawings. In the following embodiments, there is provided a mobile robot that is not to follow after a person as in the conventional technologies but to move along with a person. In other words, there is assumed a mobile robot which moves along with a person, while keeping an appropriate distance from the person so that its presence can be recognized without bothering the user.

Figure 7:
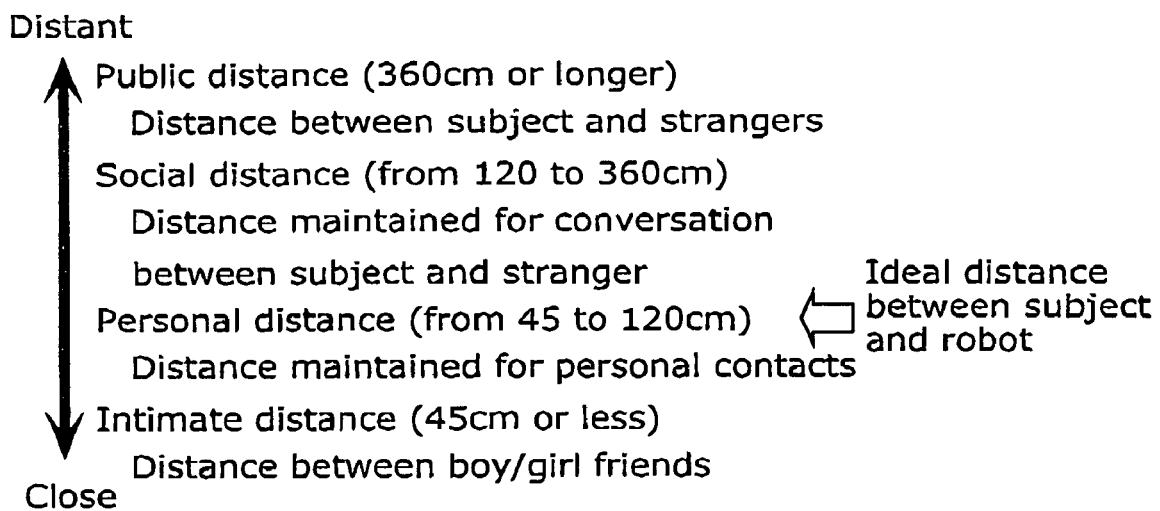
FIG. 7 is a diagram for explaining four types of distances based on proxemics.

This is based on a proxemics that is a theory developed by an American cultural anthropologist, Edward T Hall. According to the proxemics, as shown in FIG. 7, four different types of distances exist in terms of interpersonal space: an intimate distance; a personal distance; a social distance; and a public distance. The intimate distance is approximately within 45 cm in which a boyfriend and a girlfriend feel comfortable but a person other than that becomes nervous. The personal distance is approximately from 45 cm to 120 cm within which known persons feel comfortable and can understand each other's expressions. The social distance is approximately from 120 cm to 360 cm that is a distance for having a conversation with a stranger. In other words, it is a distance that is most suitable for a formal communication. The public distance is approximately 360 cm or more that is a distance between strangers and is out of the conscious range.

Figure 8:
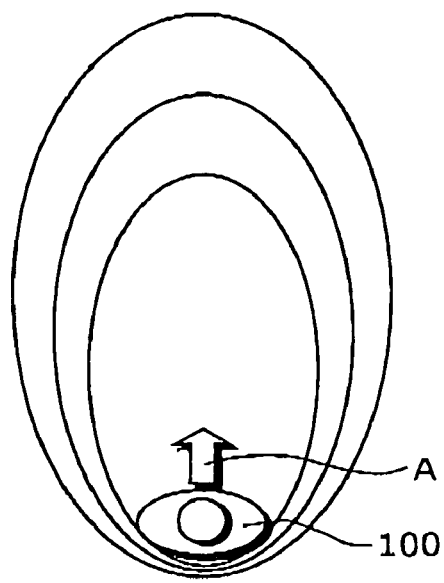
FIG. 8 is a diagram for explaining a personal space in proxemics.

Also, according to the proxemics, as shown in FIG. 8, a personal space of a person 100 is shown in an elliptic that extends forward in the case where an arrow A indicates a forward direction of the person 100.

However, in the case where the mobile robot moves in front of the person, it is bothersome at a close distance and is difficult to take an action against the person at a far distance. In addition, in the case where the mobile robot moves behind the person, it makes the person worry whether or not the robot has been following, and this situation is dangerous because the person is surprised when the mobile robot suddenly takes action.

Therefore, taking the best accompanying position of the mobile robot into consideration, it is a side of a person and is also preferred to keep the personal distance. By controlling the mobile robot to move while maintaining such position, a person can recognize the presence of the mobile robot without too much attention, and the mobile robot can take action against the person when necessary. However, it is desirable to be able to change the distance between the person and the mobile robot depending on the use of the mobile robot. For example, the distance with the person may be set to have the intimate distance in the case of a mobile robot which provides nursing care. Also, the distance may be increased in a case where the mobile robot provides touring functions and the like.

First Embodiment

Figure 9:
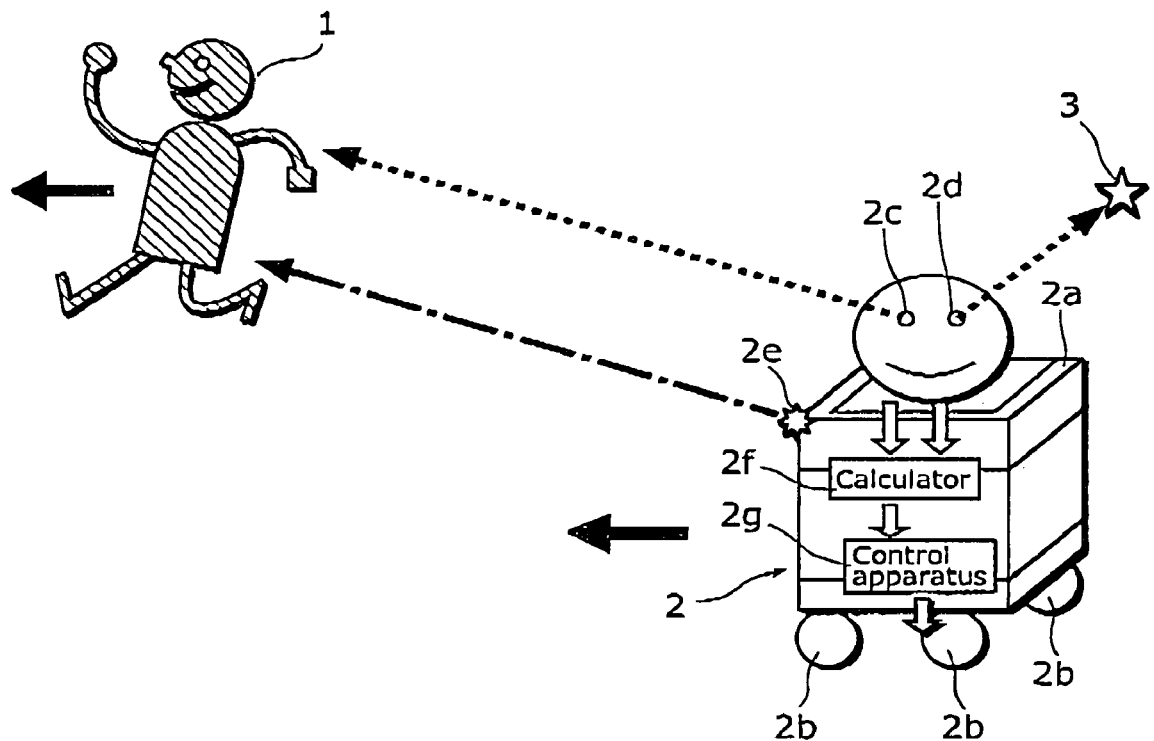
FIG. 9 is a diagram showing a structure of a mobile robot according to the first embodiment of the present invention.
Figure 10:
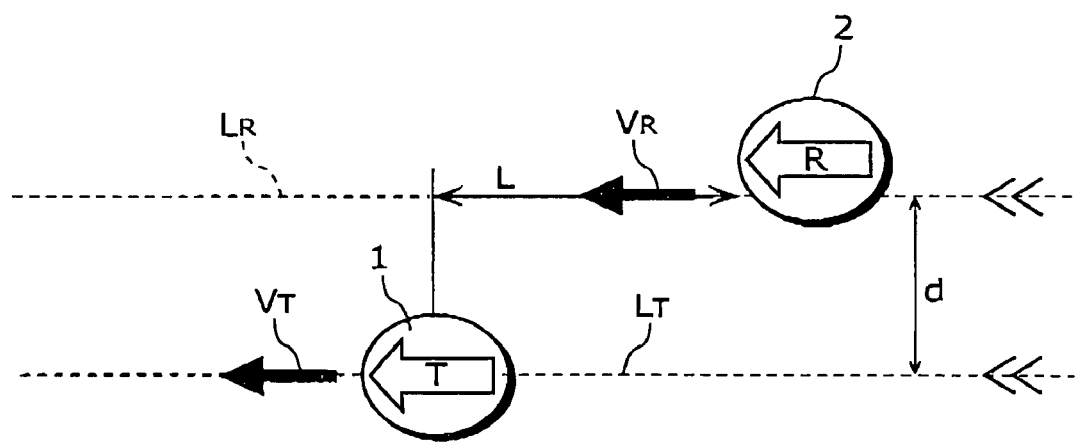
FIG. 10 is a diagram for explaining an accompanying method of the mobile robot according to the first embodiment of the present invention.

FIG. 9 is a diagram showing a structure of a mobile robot according to a first embodiment of the present invention. FIG. 10 is a diagram for explaining an accompanying method of the mobile robot according to the first embodiment of the present invention.

As shown in FIG. 9, the mobile robot 2 is a robot which moves along with an accompanied target 1, and includes: a robot body 2a; mobile mechanisms 2b such as wheels for at least moving the robot body 2a; a measurement apparatus 2c which measures a position and a velocity of the accompanied target 1; a measurement apparatus 2d which measures a position and a velocity of the robot body 2a itself; a calculator 2f which calculates a path for accompanying the accompanied target 1 based on the measurement results by the measurement apparatuses 2c and 2d; a control apparatus 2g which controls the mobile mechanisms 2b so as to move along the path calculated by the calculator 2f; and a detecting apparatus 2e which detects the accompanied target 1.

The measurement apparatus 2c and the measurement apparatus 2d detect a position on an absolute coordinate and a velocity respectively for the accompanied target 1 and the robot body 2a itself. By using, for example, a Global Positioning System (GPS) or an external sensor that is set outside the mobile robot 2 as the measurement apparatuses 2c and 2d, an absolute coordinate can be directly detected. Also, the measurement apparatus 2d may detect a position of the robot body 2a itself by detecting a dead reckoning and an external landmark 3 using a sensor placed in the mobile robot 2. Further, the measurement apparatus 2c can be a wireless device such as ultrasonic waves and a camera or a wired device such as a lead wire. Thus, an absolute matrix of the accompanied target 1 can be measured by detecting a relative position between the mobile robot 2 and the accompanied target 1 using such measurement apparatus 2c and combining the measurement results obtained by the measurement apparatus 2d.

Next, an overview of controlling an accompanying movement by the mobile robot 2 is described. For example, as shown in FIG. 10, it is assumed that the accompanied target 1 moves along a straight moving path $L_T$ at a velocity $V_T$. The mobile robot 2 accompanies the accompanied target 1 so as to move along a straight accompanying path $L_R$ that is shifted as much as a predetermined difference d toward a horizontal and vertical direction to the moving path $L_T$ of the accompanied target 1. The difference d can be determined arbitrarily in accordance with a use of the mobile robot 2.

In order to calculate the accompanying path $L_R$ of the mobile robot 2, it is necessary to obtain the moving path $L_T$ of the accompanied target 1. In order to do so, the moving path shown on an absolute coordinate system can be calculated based on a position and velocity information obtained by detecting the position and the velocity information on the absolute coordinate system of the accompanied target 1.

For example, it is assumed that an arbitrary position vector Pa on a straight line on the path $L_R$ to be followed by the mobile robot 2 is described by the following equation (1).

$$Pa=Pk+A*Vg \qquad (1)$$

Here, it is assumed that Pk is an arbitrary position vector that is positioned in at an arbitrary distance K from a point on the moving path $L_T$ of the accompanied target 1, Vg is a unit vector in a velocity direction of the accompanied target 1, and A is an arbitrary constant. Accordingly, when the position vector of the accompanied target 1 is Pg, the position vector Pk is set so as to satisfy the following equation (2).

$$|Pk-(Pg+((Pk-Pg)\cdot Vg)Vg)|=K \qquad (2)$$

Next, a control method of a moving velocity for realizing the path $L_R$ to be followed by the mobile robot 2 is described. As a velocity of the mobile robot 2, when Vr is a velocity for moving together along with the path $L_R$ to follow, ωr is an angular velocity, dθ is an angular difference between a direction of the mobile robot 2 and a direction of the path $L_R$ to follow, and dh is a distance between the mobile robot 2 and the path $L_R$ to follow, the mobile mechanisms 2b are controlled so that the velocity of the mobile robot 2 is a velocity shown in the following equation (3).

$$Vr=G1\times|Vg|, \omega r=-G2\times d\theta-G3\times dh \qquad (3)$$

Here, G1, G2 and G3 are arbitrary gains, and, in particular, the value of G1 changes depending on a condition of the mobile robot 2.

In the above control equation, when the mobile robot 2 is distant from the path $L_R$ to follow, the direction of the mobile robot 2 is corrected so as to return on the straight line that is the path $L_R$. Therefore, the mobile robot 2 can keep following the path $L_R$.

Note that, in addition to such accompanying method, the mobile robot 2 may follow the accompanied target 1 so as to keep, on the path $L_R$ to follow, a constant distance toward a moving direction of the accompanied target 1. Also, FIG. 10 shows an example in which the mobile robot 2, which moves on the right side of the accompanied target 1, is positioned only the distance L behind the accompanied target 1.

For example, a target coordinate Pl of the mobile robot 2 which follows only the distance L behind the accompanied target 1 toward its moving direction is set to satisfy the following equation (4) in addition to the conditional expression of the position vector Pa shown in the equation (1).

$$(Pl-Pg)\cdot Vg=L \qquad (4)$$

Further, in addition to the aforementioned velocity control, for example, the velocity Vr for the mobile robot 2 to move toward a translational direction may be controlled as shown in the following equation (5).

$$Vr=G1\times|Vg|+G4\times|Vg|\times dL \qquad (5)$$

Here, G4 is an arbitrary gain.

However, the difference dL is a difference toward a moving direction of the accompanied target 1 from the control target position Pl, and the control target position can be maintained by accelerating or decelerating the velocity depending on the difference using the equation (5).

Figure 11:
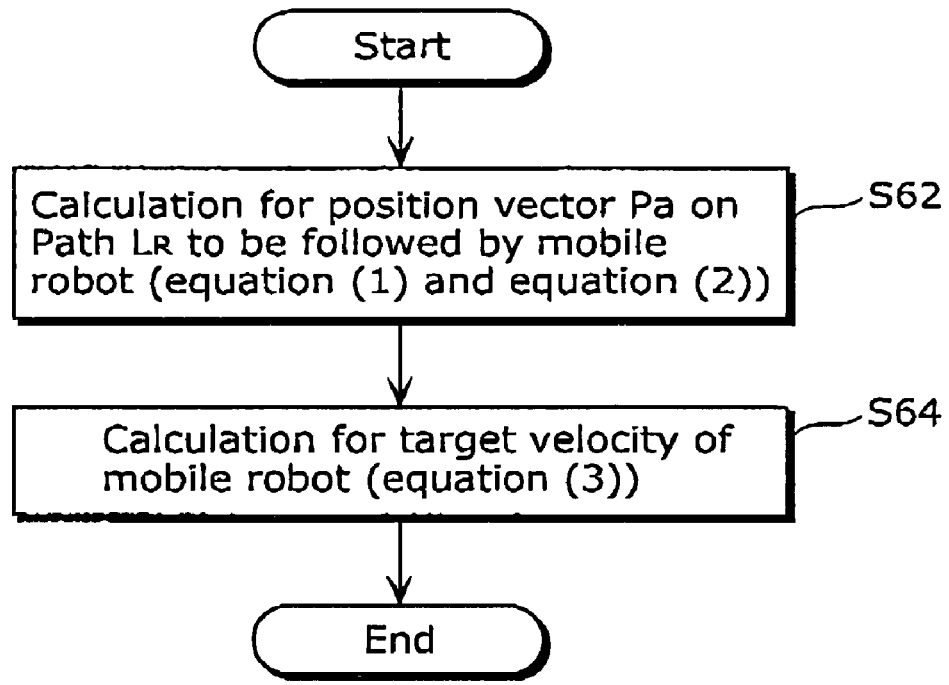
FIG. 11 and FIG. 12 are flowcharts showing a process of controlling an accompanying movement of the mobile robot.

Summarizing the aforementioned method of controlling the accompanying movement, the mobile robot 2 controls its accompanying movement as shown in FIG. 11 in order to move along the path $L_R$ which is parallel to the path $L_T$ to follow the accompanied target 1 and is shifted only by the distance d to the right side of the target direction of the accompanied target 1. In other words, the calculator 2f calculates the position vector Pa on the path $L_R$ to be followed by the mobile robot 2 (S62) using the equations (1) and (2). The calculator 2f then calculates a target velocity of the mobile robot 2 (S64) using the equation (3). The control device 2g controls the control mechanisms 2b and the movement of the mobile robot 2 in accordance with the calculation results obtained in S62 and S64.

Figure 12:
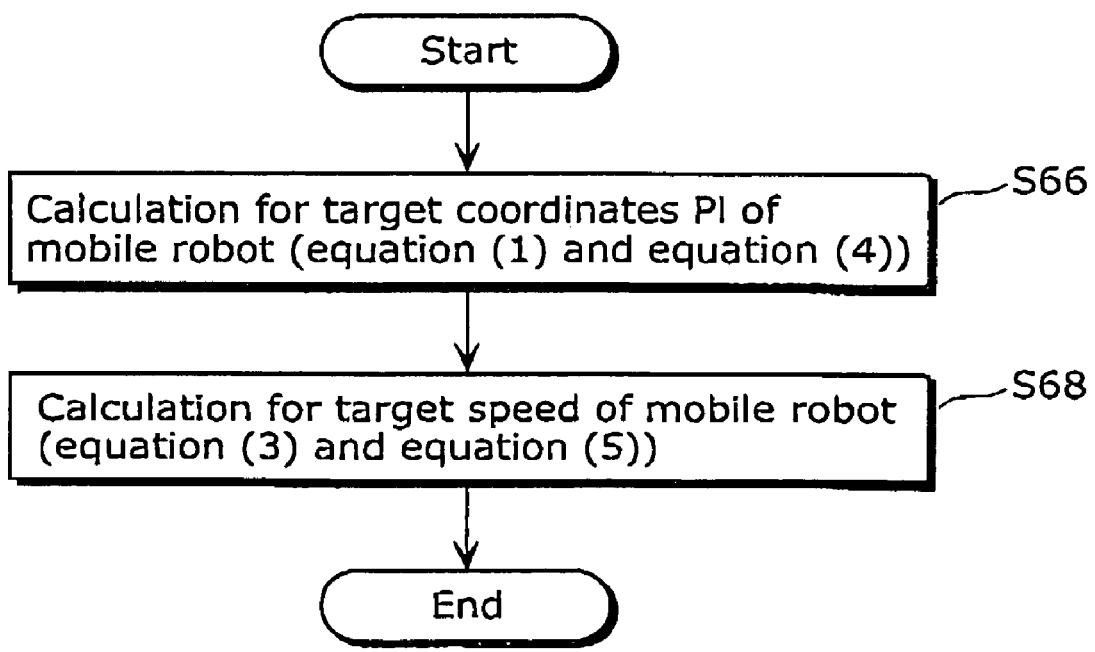

Further, the mobile robot 2 controls its accompanying movement as shown in FIG. 12 in order to move along the path $L_R$ to follow and to follow by the distance L behind the accompanied target 1. In other words, the calculator 2f calculates the target coordinate PI of the mobile robot 2 (S66) using the equations (1) and (4). The calculator 2f then calculates the velocity Vr for the mobile robot 2 to move toward the translational direction using the equation (5), and calculates the angular velocity ωr of the mobile robot 2 using the equation (3) (S68). The control apparatus 2g controls the control mechanisms 2b and controls the movement of the mobile robot 2 based on the calculation results obtained in S66 and S68.

Figure 13:
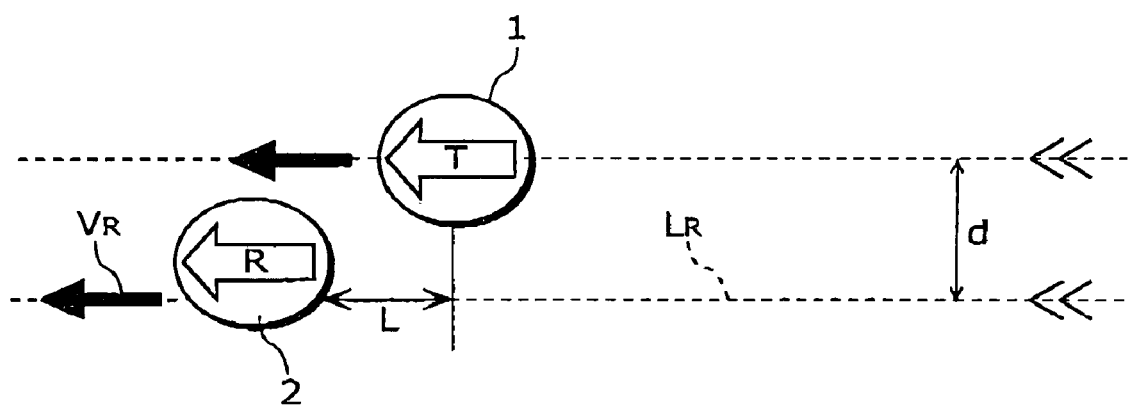
FIG. 13 is a diagram for explaining the accompanying method of the mobile robot according to the first embodiment of the present invention.

Note that, while an example that the path $L_R$ to follow which is parallel to the moving path $L_T$ is positioned on the right side of the accompanied target 1 is explained in FIG. 10, the movement control of the mobile robot 2 can be performed even in the case where it is positioned on the left side as shown in FIG. 13 by performing a similar control. In addition, the mobile robot 2 may be positioned forward of the accompanied target 1 as shown in FIG. 13 or on its side.

FIG. 13 shows an example in which the mobile robot 2 moves at a velocity $V_R$ along the path $L_R$ which is parallel to the moving path $L_T$ and is shifted by the distance d toward the left side of the moving direction of the accompanied target 1. The distance d in the vertical direction to the left and right can be arbitrarily set. Further, FIG. 13 shows an example in which the mobile robot 2, which moves at the left side of the accompanied target 1, is positioned the distance L ahead of the accompanied target 1.

By the way, the case of a straight path is explained for the accompanying method shown in FIG. 10. However, in fact, the accompanying path of the mobile robot 2 changes in accordance with the position and velocity of the accompanied target 1. Therefore, the position and velocity of the accompanied target 1 varies due to the variation of an output of a sensor and the like. As a result, the accompanying path of the mobile robot 2 varies so that the operation may be somewhat unnatural.

Figure 14:
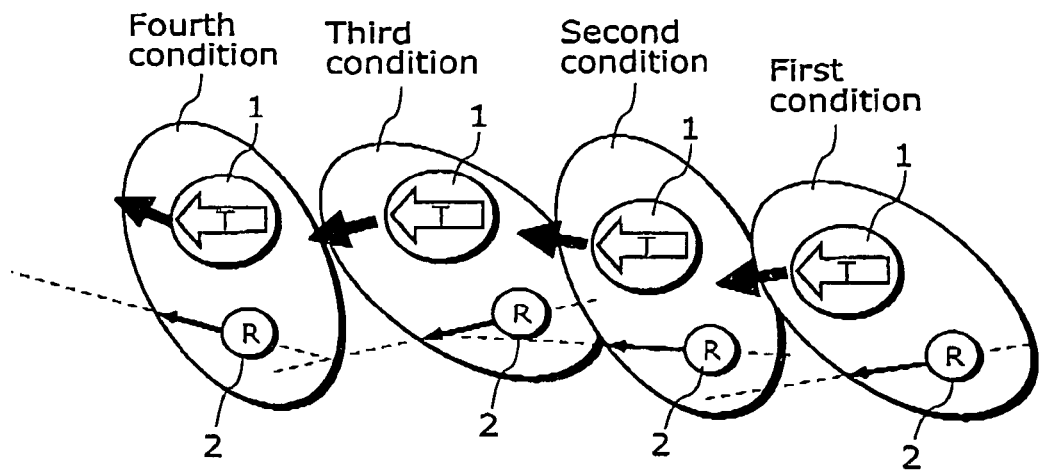
FIG. 14 is an illustration showing a problem of variations of the position and velocity of the mobile robot.

FIG. 14 is an illustration showing a problem caused by variations of the position and velocity of an accompanied target. The mobile robot 2 moves along with the accompanied target 1. However, when the position and velocity of the accompanied target 1 are detected as varied as shown so that the accompanied target 1 is in the first condition to the second condition and the accompanied target 1 is in the third and fourth conditions, the target position for the mobile robot 2 to accompany similarly varies. As a result, a difference is generated between the calculated path to follow and the moving path of the accompanied target 1 so that there is a possibility that a stable accompanying behavior cannot be performed.

Figure 15:
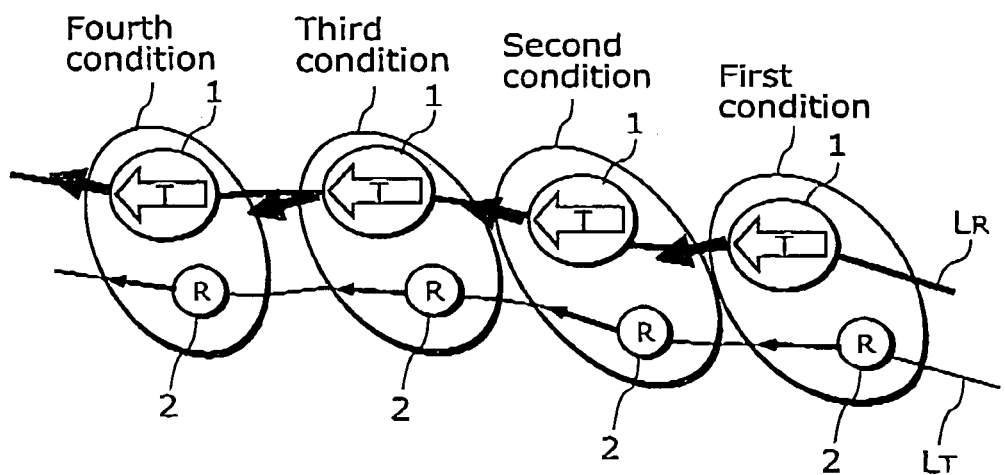
FIG. 15 is a diagram showing a moving condition of the mobile robot in the case where the position and velocity of the accompanied target vary.

FIG. 15 is a diagram showing states of movement of the mobile robot 2 in the case where the position and velocity of the accompanied target 1 vary.

For example, the mobile robot 2 calculates a smooth moving path $L_T$ by performing smoothing, for the position and velocity of the accompanied target 1 in the first to fourth conditions as shown in FIG. 15, on the output of the measurement device 2c through a low-pass filter and the like so as to smooth the output value of the sensor. Also, the mobile robot 2 calculates a movement path $L_R$ to follow as compared to the moving path $L_T$.

Thus, the dispersed variation of the position and velocity of the accompanied target 1 is smoothed by correcting the variation of the positions and velocity of the accompanied target 1 measured by the measurement apparatus 2c so that smooth movement of the mobile robot 2 can be achieved.

Figure 16:
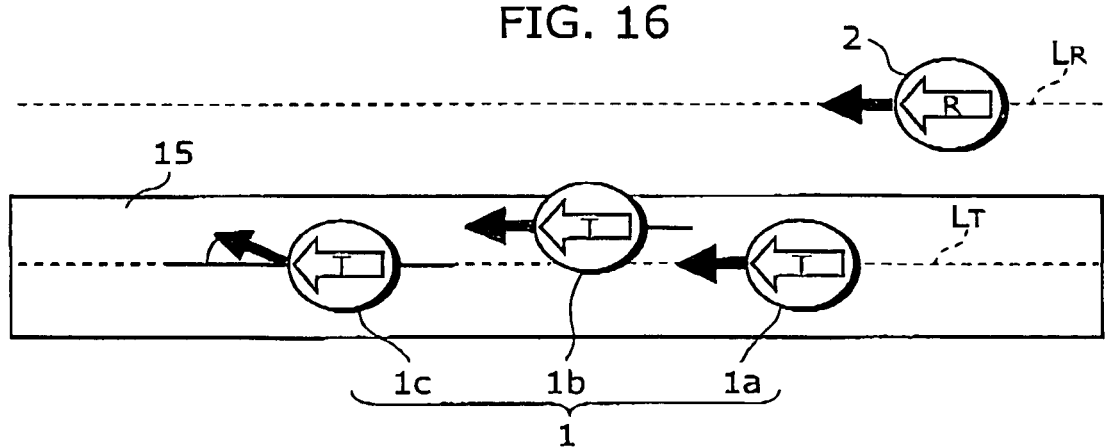
FIG. 16 is a diagram showing a continuous region with a predetermined width set for the position and velocity of the accompanied target.

Further, as shown in FIG. 16, by setting a continuous region 15, which maintains a constant width from the position and velocity of the accompanied target 1 measured by the measurement apparatus 2c, when the accompanied target 1 moves within a range of the continuous region 15, the mobile robot 2 controls itself so as to continue moving along the current path $L_R$. For example, by setting a continuous region 15 that expands a predetermined width toward the right and left of the path $L_T$ of the accompanied target 1 which is currently accompanied, the mobile robot 2 is controlled so as to measure the movement of the path $L_R$ as long as the accompanied target 1 moves within the continuous region 15. For example, in the case where the accompanied target 1 moves in order of a position 1a, a position 1b and a position 1c as shown, the accompanied target 1 is within the continuous region 15. Also, in the case where the moving direction of the accompanied target 1 is within a predetermined allowance range as compared to the path $L_T$, the mobile robot 2 moves so as to continue moving on the current path $L_R$ to follow the accompanied target 1.

Figure 17:
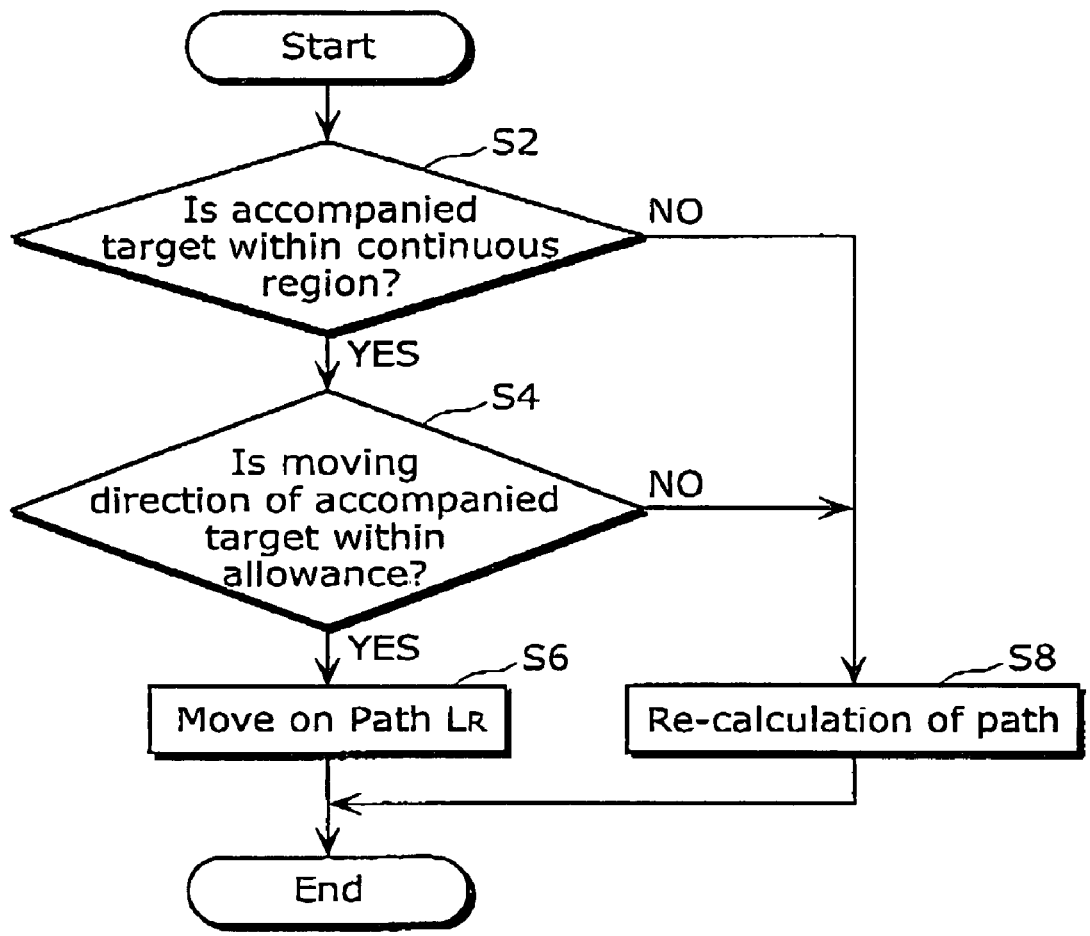
FIG. 17 is a flowchart showing a movement control process of the mobile robot using the continuous region of the accompanied target.

FIG. 17 is a flowchart showing a summary of the aforementioned control process. In detail, the mobile robot 2 moves so as to continue moving along the current path $L_R$ (S6), in the case where the accompanied target 1 is within the continuous region 15 and the moving direction of the accompanied target 1 is within the predetermined range (YES in S2 and YES in S4).

Other than the above, the mobile robot 2 re-calculates the path $L_R$ in accordance with the position and velocity of the accompanied target 1 (S8) in the following cases: where the accompanied target 1 is outside the continuous region 15 (NO in S2); and where the moving direction of the accompanied target 1 has rapidly changed (NO in S4).

Through this, the mobile robot 2 can follow the accompanied target 1 without exhibiting unnatural behavior even in the case of dispersed variations. In other words, the mobile robot 2 does not sensitively respond to a change in an output value from a sensor.

Note that, a width of the continuous region 15 differs depending on the specific task performed by the mobile robot 2 on the accompanied target 1. Specifically, in the case where the robot provides nursing care, the distance has to be set to be smaller so that the robot can immediately help a person when the person falls. Also, in the case where the robot provides guiding and touring functions, the distance has to be set to be larger because it is important for the guiding robot not to collide with a person.

Next, explanation is provided about the case where the accompanied target 1 repeatedly stops and moves.

In the accompanying method shown in FIG. 14 to FIG. 17, the accompanying path is determined in accordance with the position and velocity of the accompanied target 1. However, when the accompanied target 1 stops, the velocity becomes 0 because a moving direction no longer exists. Therefore, the mobile robot 2 stops because it cannot set a target position for the accompanying movement. Also, in the case where the accompanied target 1 stops in a distant position, the mobile robot 2 stops at the current position even when the position is distant.

Such accompanying movement is sufficient enough in the case where the accompanied target 1 does not repeatedly stop and move. However, in the case where a path changes suddenly when the accompanied target 1 starts moving again, the mobile robot 2 needs to consume mobile capability so as to approach a newly generated path, causing further accompanying delay. Accordingly, when the stopping and moving of the target are repeated, the delay is gradually increased. As a result, there is a possibility that the mobile robot 2 will lose sight of the accompanied target 1.

Figure 18:
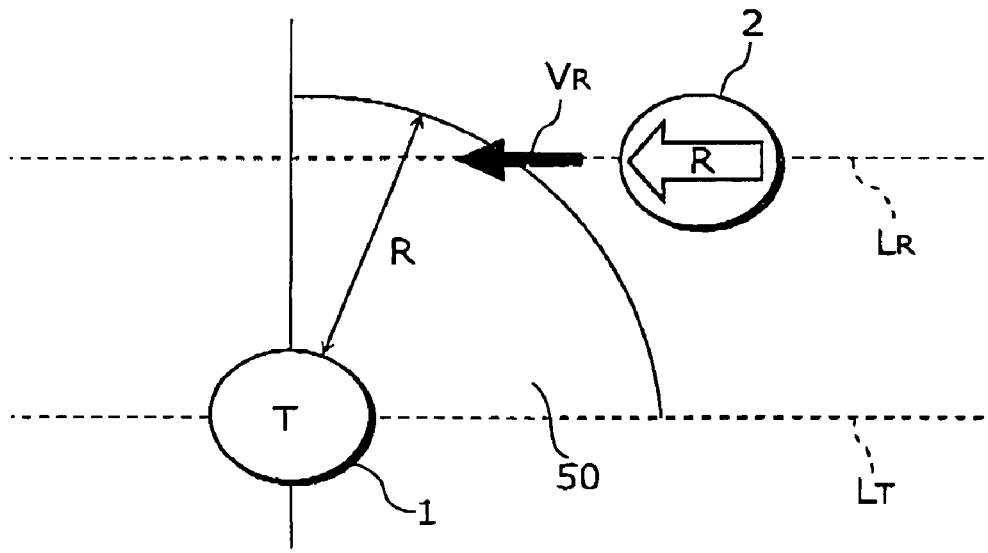
FIG. 18 is a diagram for explaining movement control of the mobile robot when the accompanied target stops.

Accordingly, as shown in FIG. 18, the mobile robot 2 continues moving on the current path $L_R$ to follow without stopping in the case where the moving velocity of the accompanied target 1 becomes 0. The mobile robot 2 then continues moving until it reaches the range 50 at a constant distance R away from the accompanied target 1. When the mobile robot 2 enters the range 50, it stops moving for safety reasons.

By controlling the mobile robot 2 in the aforementioned manner, the mobile robot 2 stops, not at the current position, but after reaching a predetermined range even in the case where the accompanied target 1 stops at a distance. As a result, even in the case where the accompanied target 1 repeats stopping and moving, the mobile robot 2 does not lose sight of the accompanied target 1 because the moving loss of the mobile robot 2 does not accumulate so that the delay is minimized.

Figure 19:
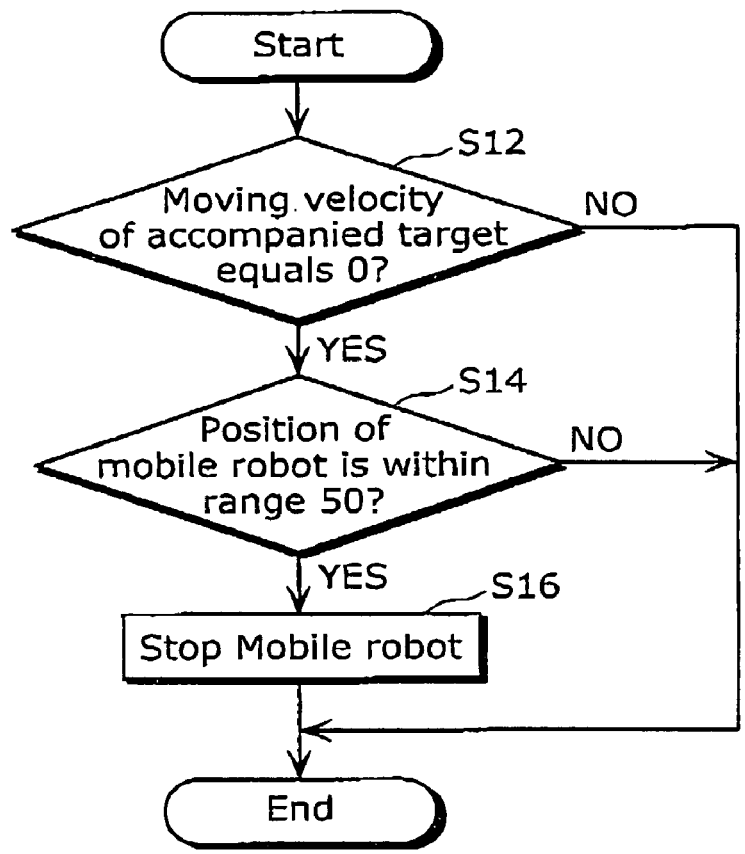
FIG. 19 is a flowchart showing the process of controlling the movement of the mobile robot when the accompanied target stops.

FIG. 19 is a flowchart showing the aforementioned control process. Specifically, the mobile robot 2 is controlled so as to stop (S16) in the case where the moving velocity of the accompanied target 1 becomes 0 (YES in S12) and where the mobile robot 2 enters within the range 50 (YES in S14).

Next, the movement control of the mobile robot 2 in the case where the accompanied target 1 has suddenly and significantly changed the moving direction is described.

In the accompanying method shown in FIG. 14 to FIG. 17 only, a path to be followed by the mobile robot 2 is calculated so as to maintain a predetermined positional relationship in accordance with the position and velocity of the accompanied target 1. Accordingly, in the case where the accompanied target 1 has suddenly changed the moving direction significantly, the mobile robot 2 also needs to significantly change the target position for accompanying and the path to follow. Therefore, there is a possibility of causing a delay of accompanying behavior and a collision with the accompanied target 1 in a process of changing the path to follow.

Figure 20:
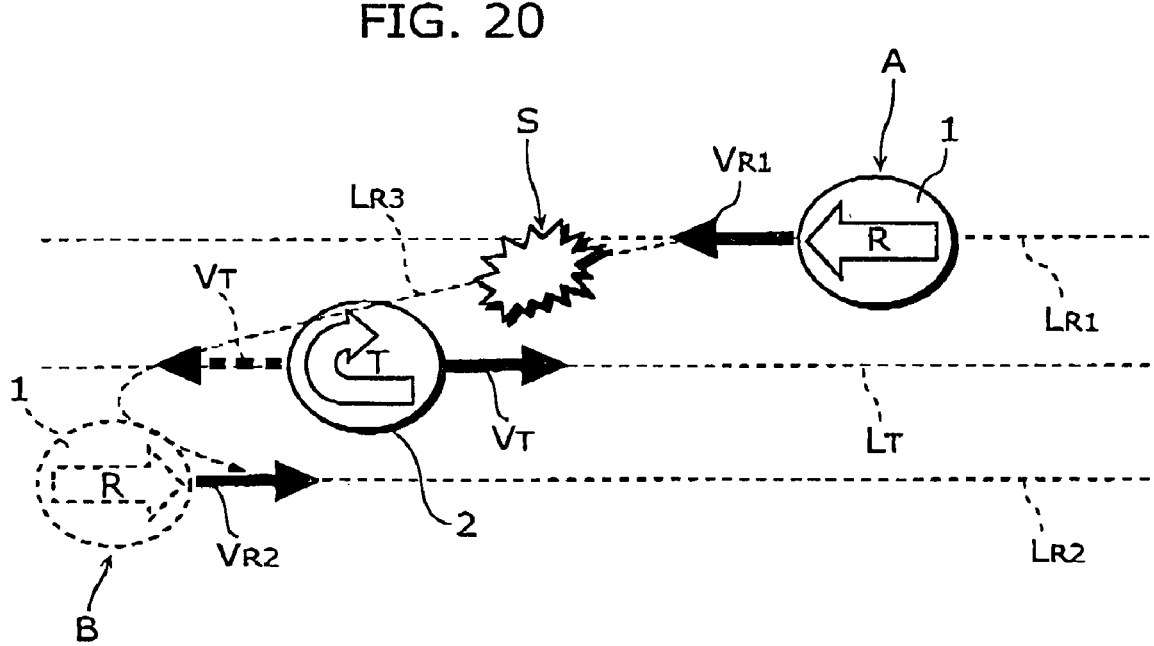
FIG. 20 is a diagram for explaining a problem when the accompanied target has made a U-turn.

For example, as shown in FIG. 20, in the case where the mobile robot 2 follows after the accompanied target 1, when the accompanied target 1 makes a U-turn, the position B and the velocity $V_{R2}$ are required immediately after making the U-turn in place of the position A and the moving velocity $V_{R1}$ of the mobile robot 2 immediately before the U-turn is made. Accordingly, in order to realize this moving path, a big turn path such as a path $L_{R3}$ to follow as shown in FIG. 20 is required, which may cause an accompanying delay while making the big turn and a collision with the accompanied target 1 may be caused at a predetermined point S on the path $L_{R3}$ to follow.

Figure 21:
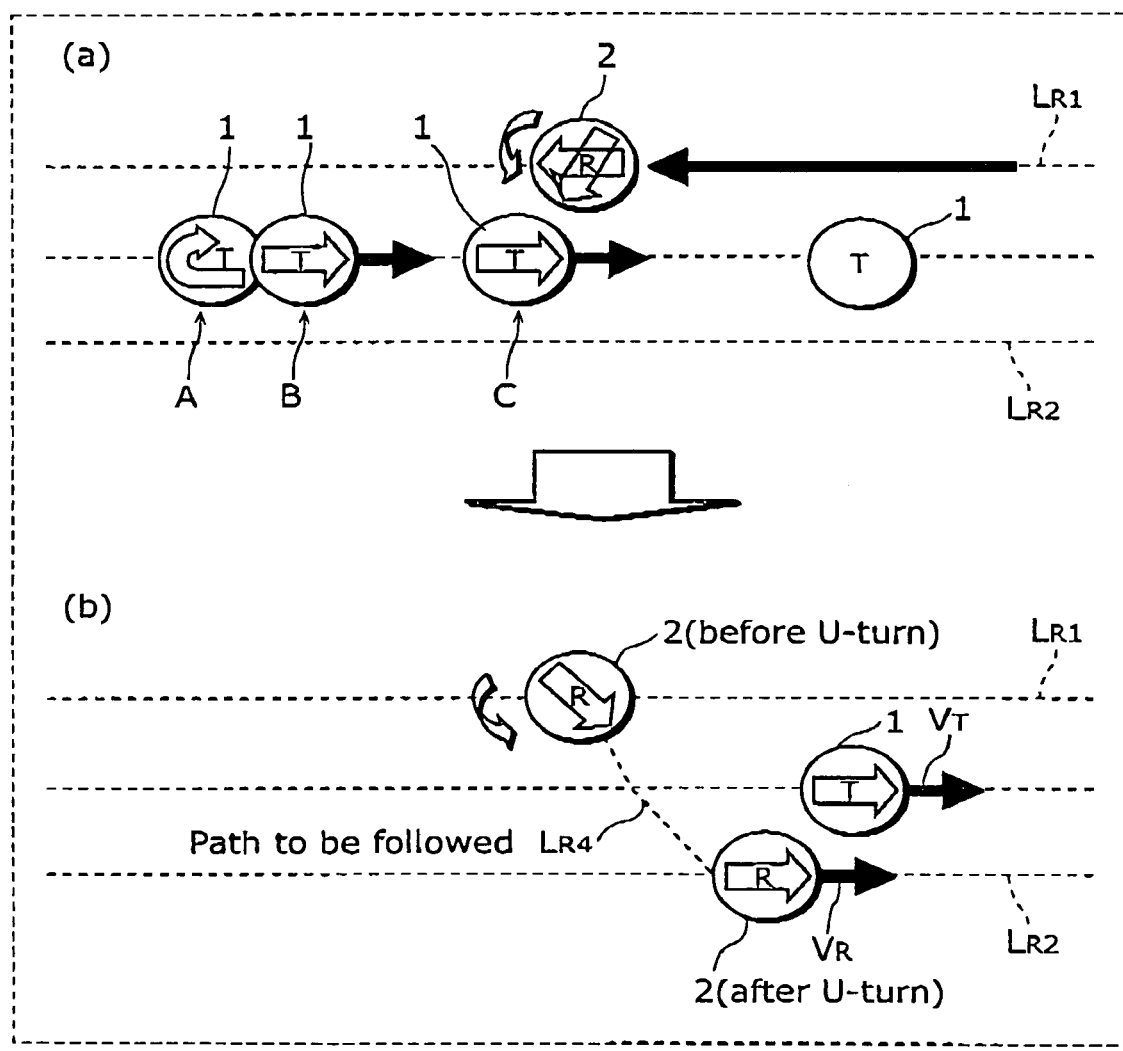
FIG. 21 is a diagram for explaining an accompanying method for the time when the accompanied target makes a U-turn.

FIG. 21 is a diagram for explaining an accompanying method for the case where the accompany target makes a U-turn. In the diagram, the followings are shown: a path $L_{R1}$ to follow that is a path when the accompanied target 1 does not make a U-turn; a path $L_{R2}$ to follow that is a path after the accompanied target 1 has completed making the U-turn; and a path $L_{R4}$ to follow that is a path when the accompanied target 1 started moving away from the mobile robot 2.

As shown in FIG. 21(a), in the case where the accompanied target 1 moves toward the mobile robot 2 after making the U-turn, in other words, in the case where the accompanied target 1 moves in order of a position A, a position B and a position C, the mobile robot 2 stops without following the accompanied target 1, and controls only the direction of the mobile robot 2 so as to face toward the accompanied target 1. Then, as shown in FIG. 21(b), the mobile robot 2 re-starts following the accompanied target 1 after the accompanied target 1 has passed the mobile robot 2, and changes the path to the path $L_{R2}$ moving through the path $L_{R4}$.

According to such an accompanying method, the path $L_{R4}$ to follow for a change of the path to follow caused by the U-turn becomes very short compared to the path $L_{R3}$ to follow in FIG. 20. Therefore, the accompanying delay is very small and there is no possibility of causing a collision with the accompanied target 1 because the accompanied target 1 has already passed the mobile robot 2.

Figure 22:
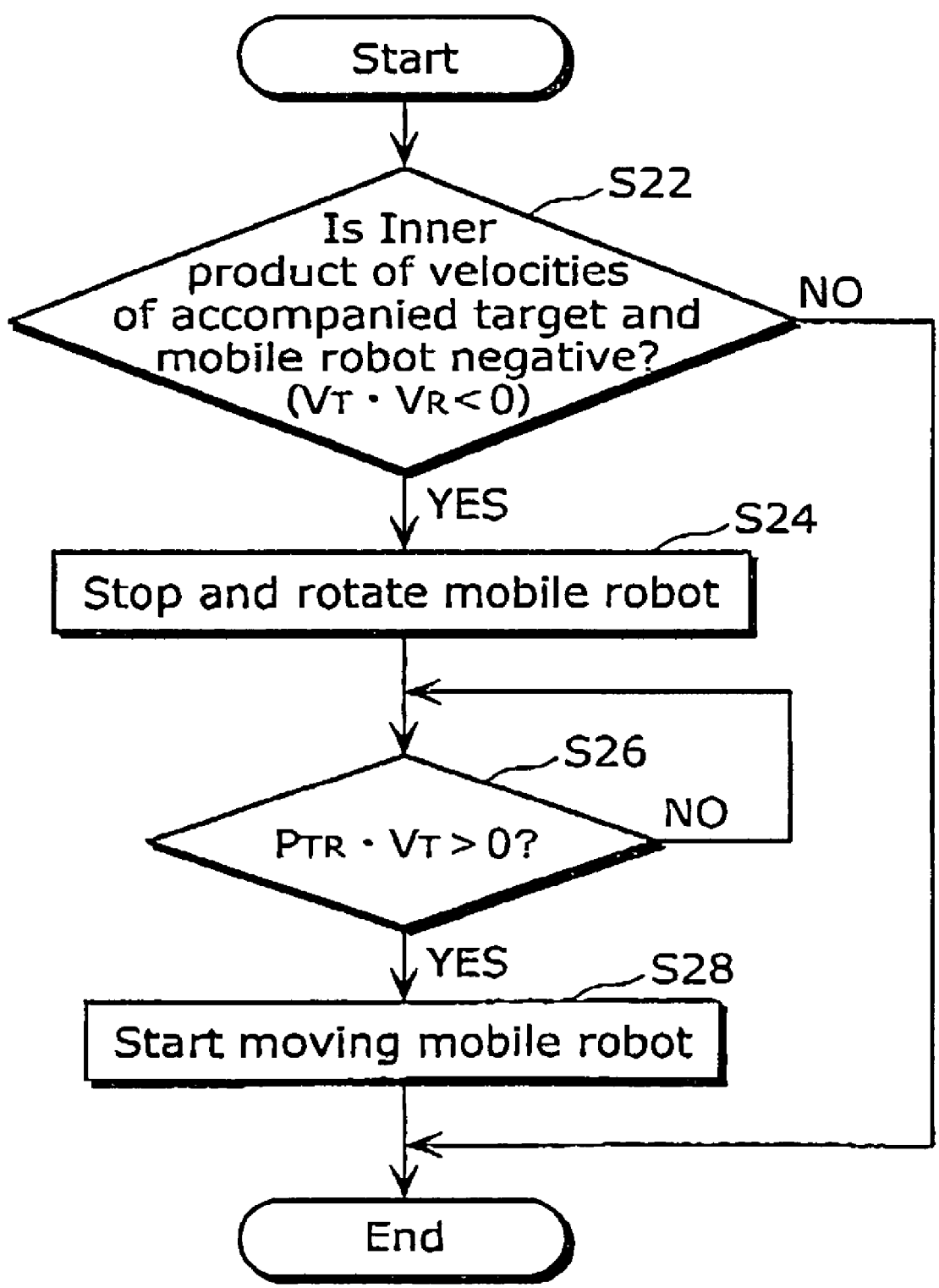
FIG. 22 is a flowchart showing a process of controlling the movement of the mobile robot when the accompanied target makes a U-turn.

FIG. 22 is a flowchart showing a process for realizing the aforementioned control.

The mobile robot 2 judges whether or not an inner product of the velocity $V_T$ of the accompanied target 1 and the velocity $V_R$ of the moving robot 2 satisfies the following equation (6) (S22).

$$V_T \cdot V_R < 0 \qquad (6)$$

In the case where the equation (6) is satisfied (YES in S22), it indicates that the accompanied target 1 and the mobile robot 2 do not face the same direction, that is, the accompanied target has made a U-turn. Accordingly, the mobile robot 2 is stopped in order to avoid the collision between the accompanied target 1 and the mobile robot 2 (S24). Therein, only the direction of the mobile robot 2 is changed while stopping the mobile robot 2. In other words, in order to stop the mobile robot 2 and only change the direction, for example, the direction of the mobile robot 2 may be controlled so as to satisfy the judgment equation as shown in the following equation (7).

$$Fr \cdot Vg < 0 \qquad (7)$$

Here, Fr is a vector showing a direction of a robot. Vg is a unit vector in a velocity direction of the accompanied target 1 as described above.

Next, an inner product between a direction vector $P_{TR}$ of the accompanied target 1 and the velocity $V_T$ of the accompanied target 1 based on the mobile robot 2 is calculated (YES in S26). The mobile robot 2 then judges whether or not the inner product satisfies the following equation (8) (S26).

$$P_{TR} \cdot V_T > 0 \qquad (8)$$

In the case where the equation (8) is satisfied (YES in S26), it is indicated that the accompanied target 1 is moving away from the mobile robot 2. Therefore, the mobile robot 2 starts to move again (S28).

The mobile robot 2 using the aforementioned accompanying method and having the structure does not collide with the accompanied target 1 by taking a sufficient difference between the path of the accompanied target 1 and the path to be followed by the mobile robot 2, even in the case where the accompanied target 1 suddenly stops in an ordinary condition.

Figure 1:
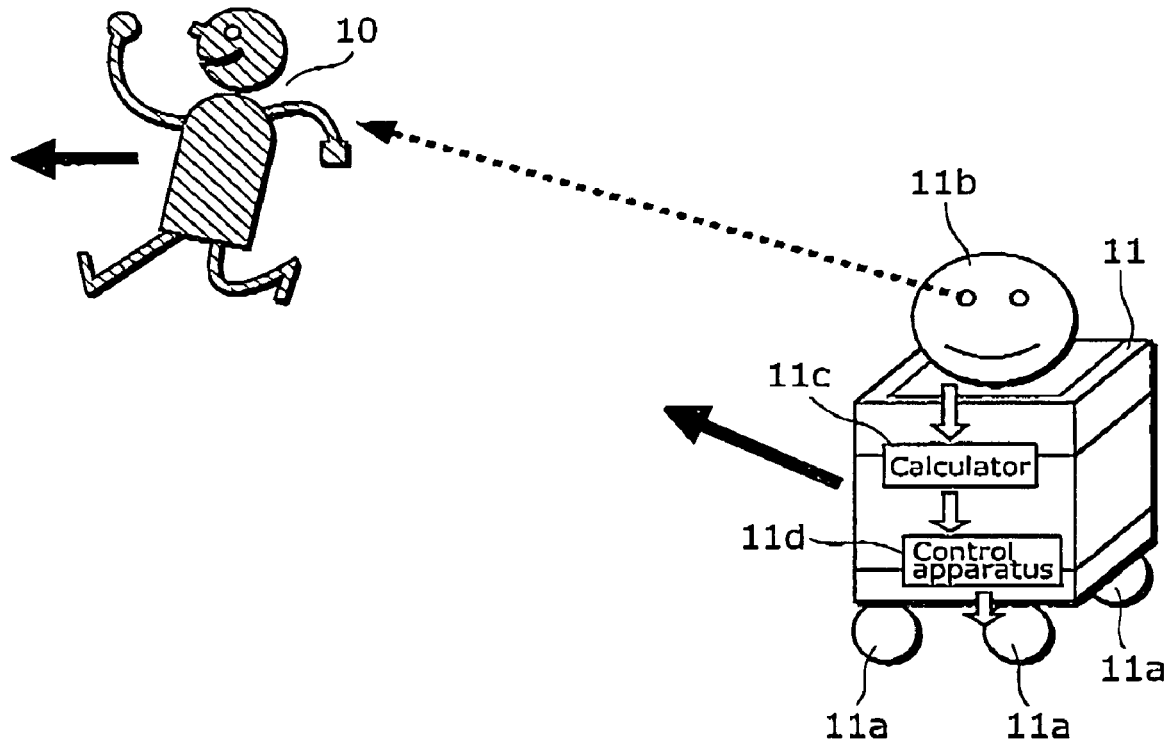
FIG. 1 is a diagram showing a structure of a conventional mobile robot.
Figure 2:
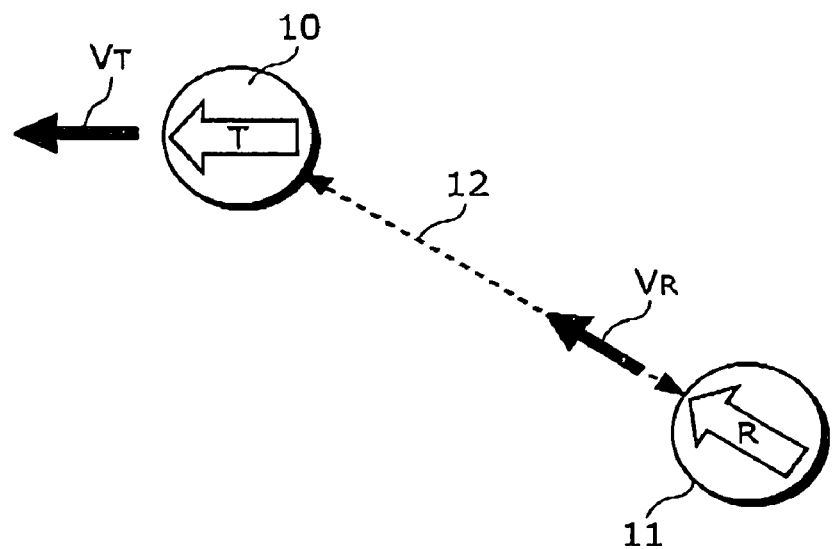
FIG. 2 is a diagram showing an accompanying method for use in the conventional mobile robot.
Figure 3:
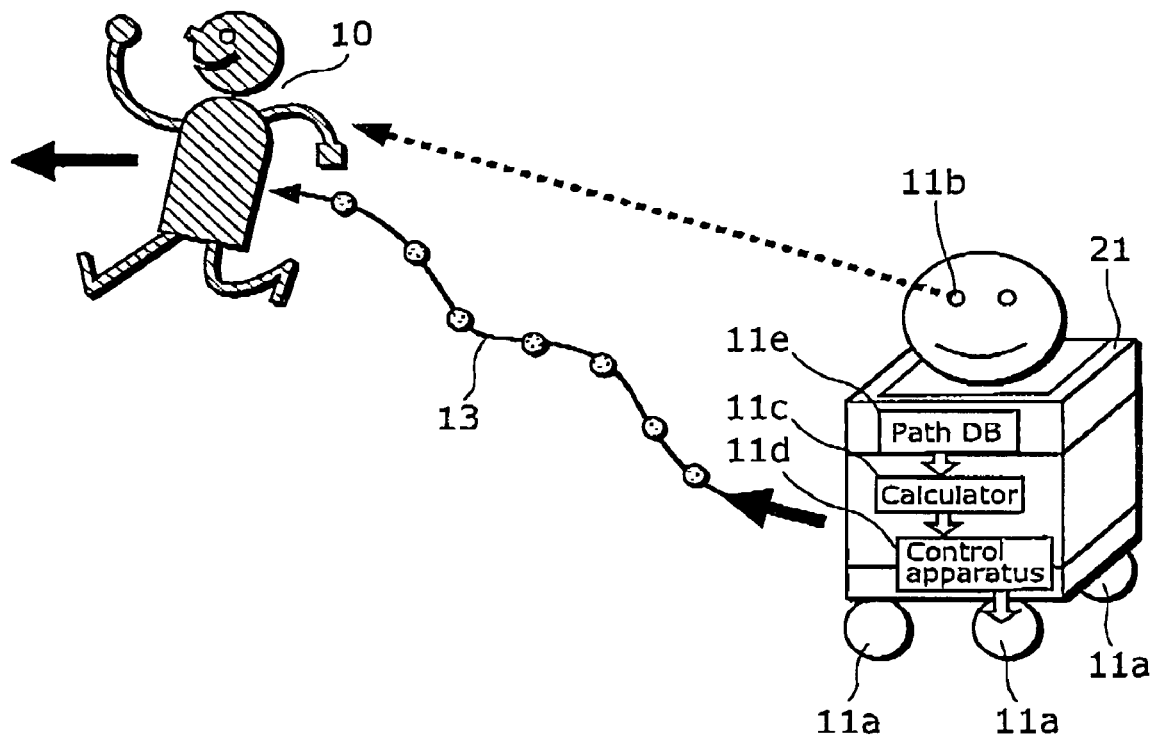
FIG. 3 is a diagram showing a structure of the conventional mobile robot.
Figure 4:
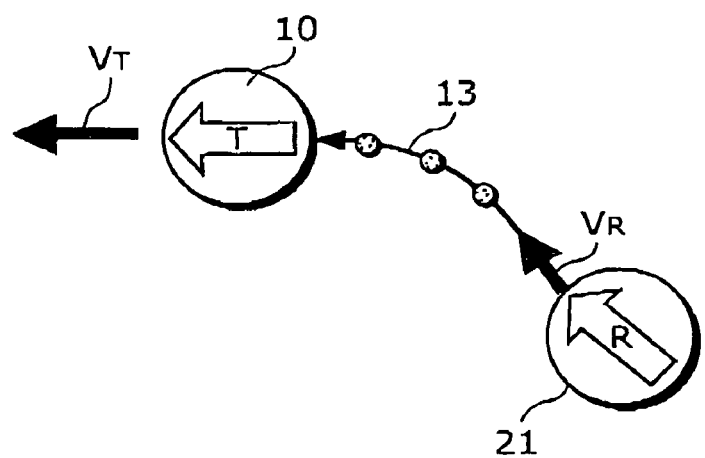
FIG. 4 is a diagram showing an accompanying method of the conventional mobile robot.
Figure 5:
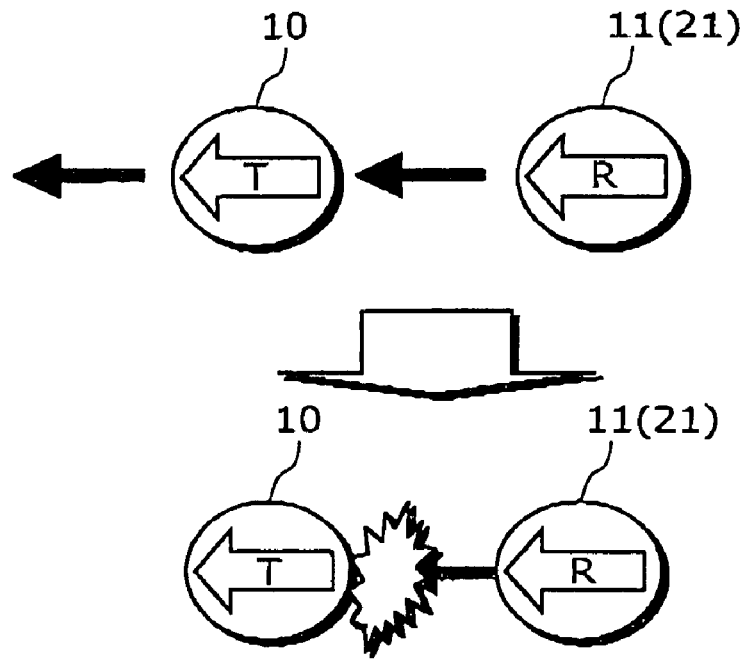
FIG. 5 is a diagram for explaining a problem relating to a collision between an accompanied target and a mobile robot.
Figure 6:
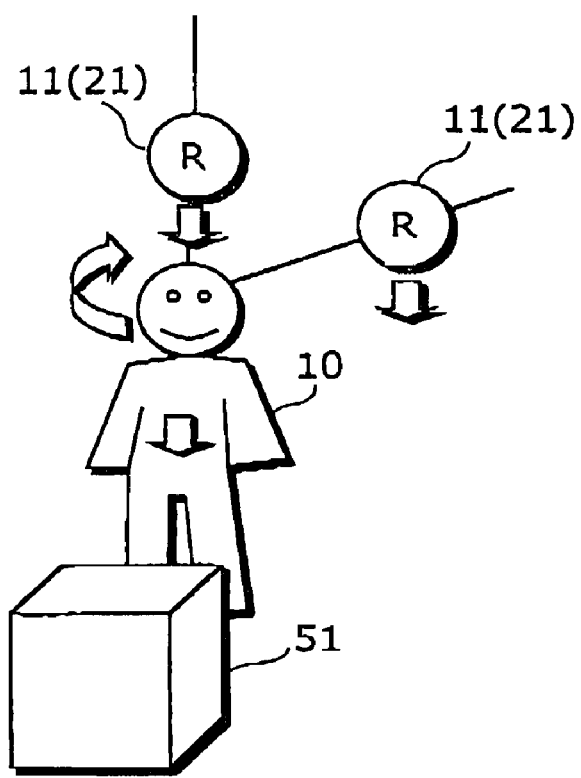
FIG. 6 is a diagram showing an example relating to a checking of an accompanying condition of the mobile robot.

Further, according to the mobile robot 2 of the present embodiment, as shown in FIG. 6, the mobile robot is shifted vertically toward a moving direction in the case where the accompanied target for the mobile robot 2 is a person. Therefore, the person can recognize the mobile robot without turning his/her neck around or turning his/her body back. Consequently, for example, an accident in which a person collides with an obstacle on a moving direction of the person while checking the mobile robot can be prevented.

Second Embodiment

Figure 23:
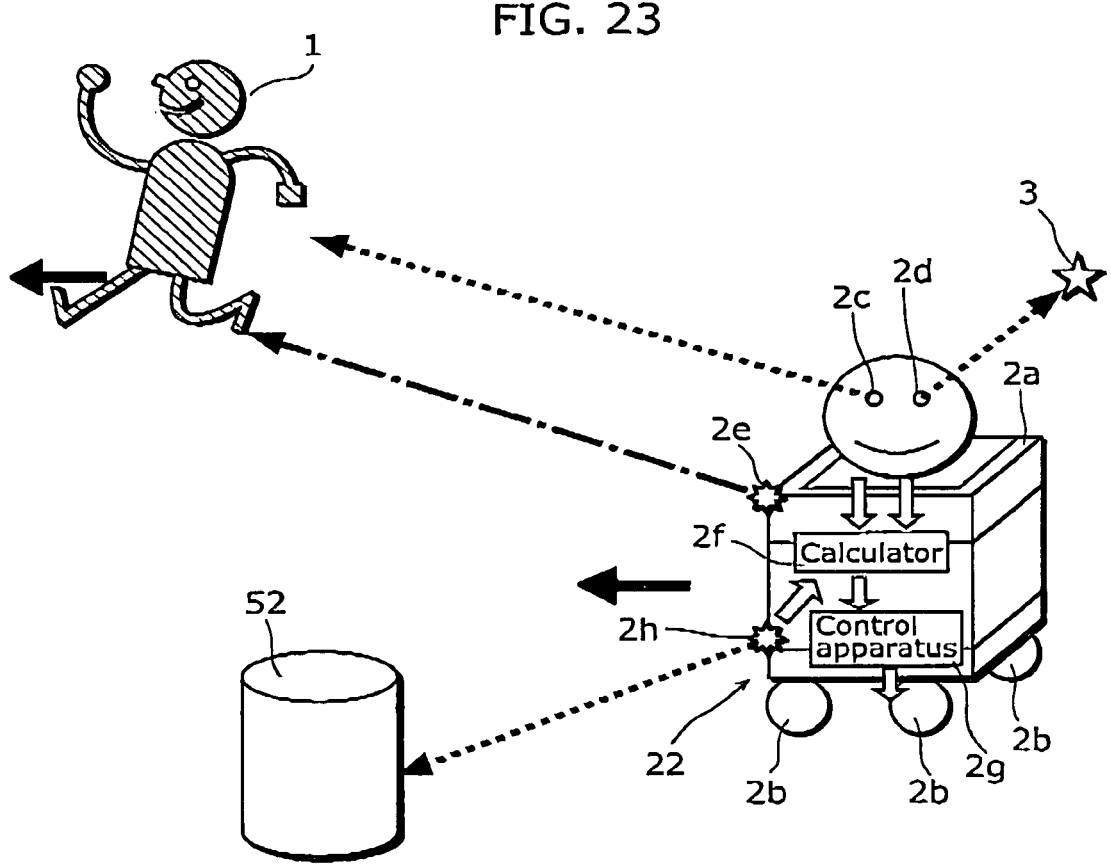
FIG. 23 is a diagram showing a structure of a mobile robot according to a second embodiment of the present invention.

FIG. 23 is a diagram showing a structure of a mobile robot according to the second embodiment of the present invention.

Figure 24:
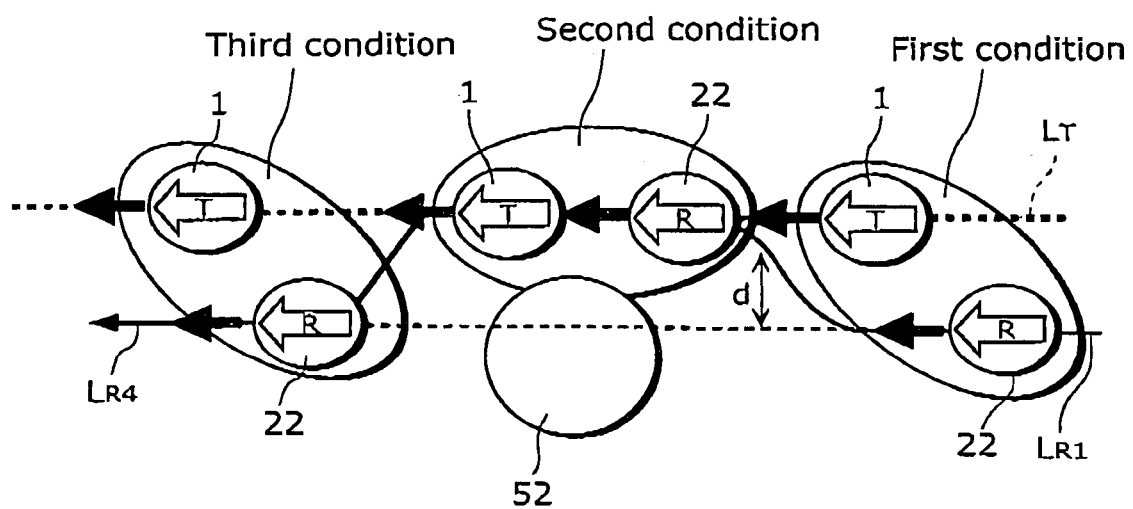
FIG. 24 is a diagram for explaining movement control of the mobile robot when there is an obstacle in front of the mobile robot.
Figure 25:
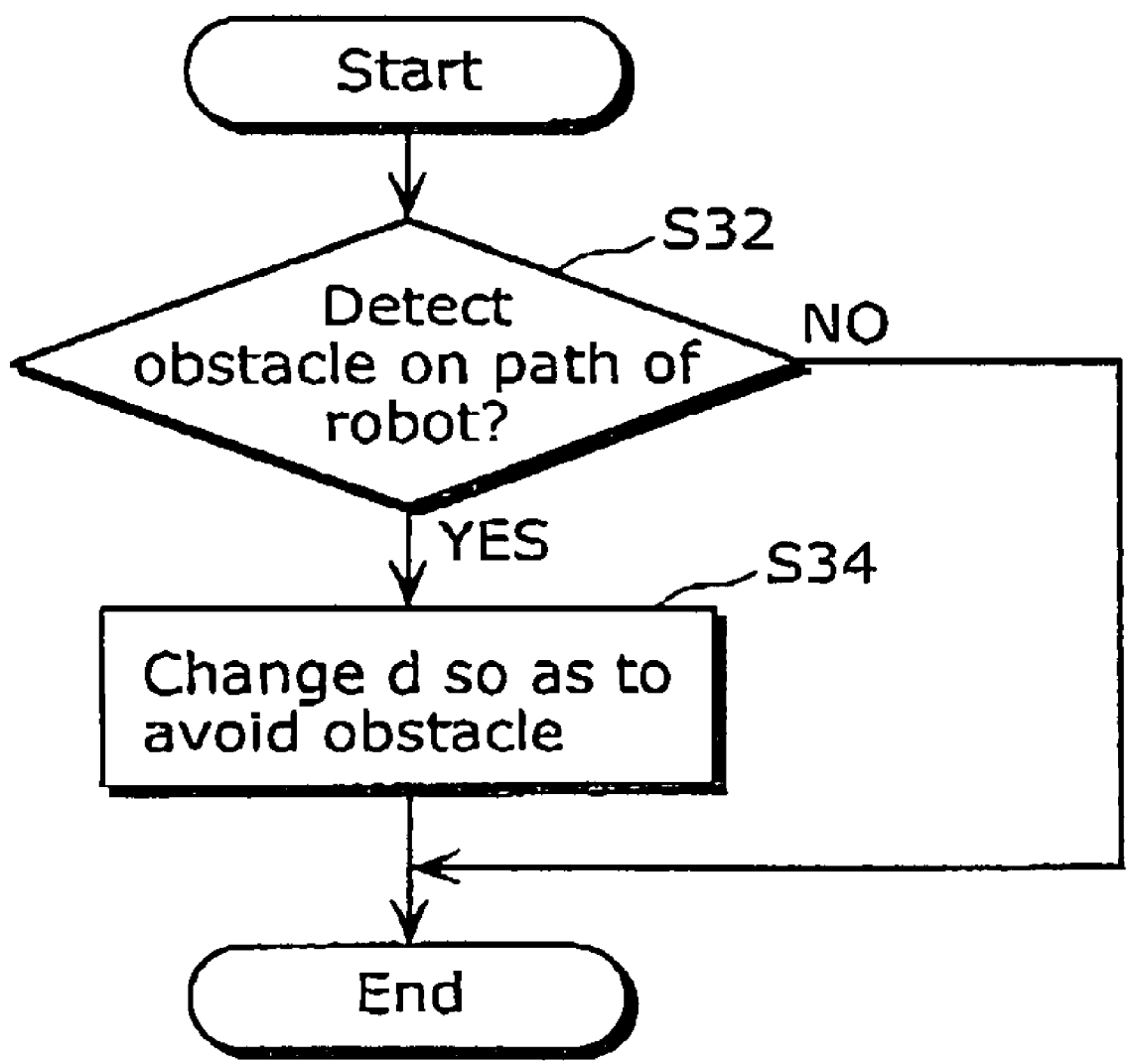
FIG. 25 is a flowchart showing a process of controlling the movement of the mobile robot when there is an obstacle in front of the mobile robot.
Figure 26:
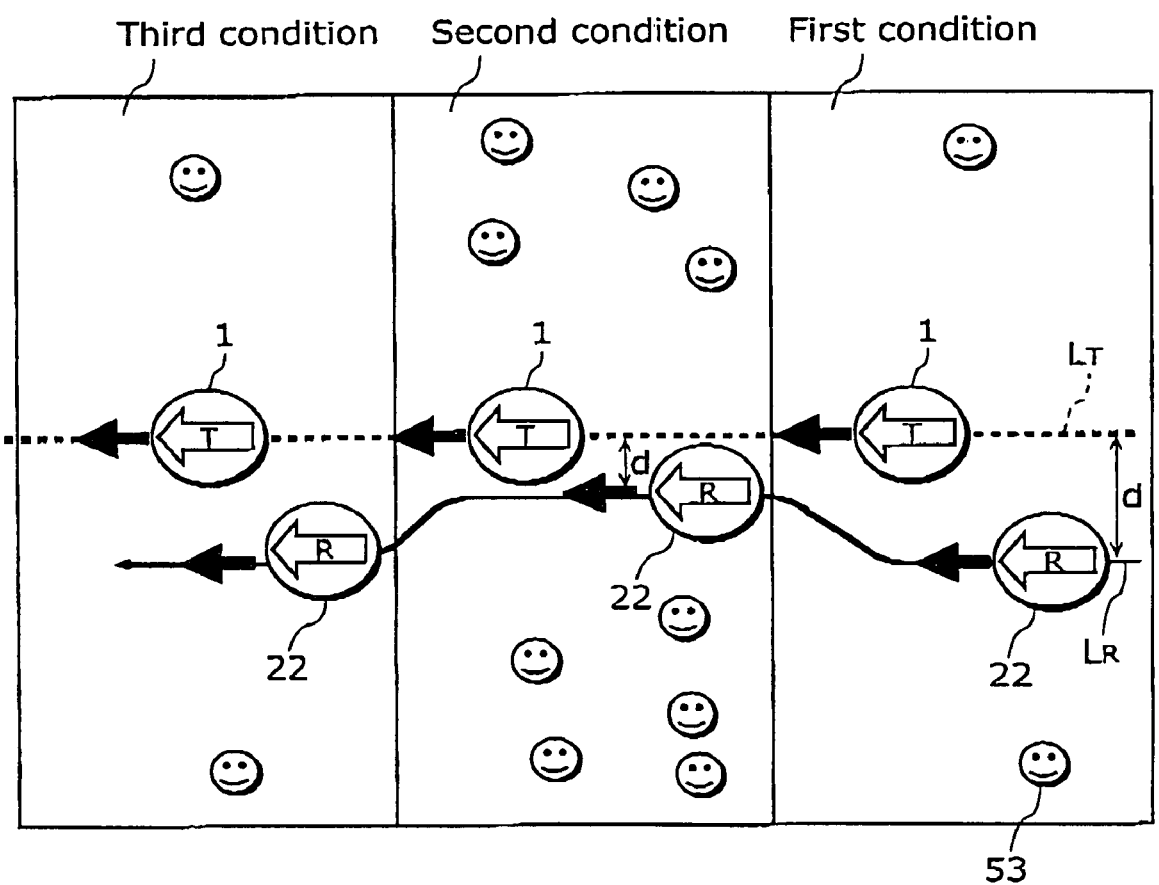
FIG. 26 is a diagram for explaining movement control of a mobile robot based on the degree of congestion of the surrounding environment.
Figure 27:
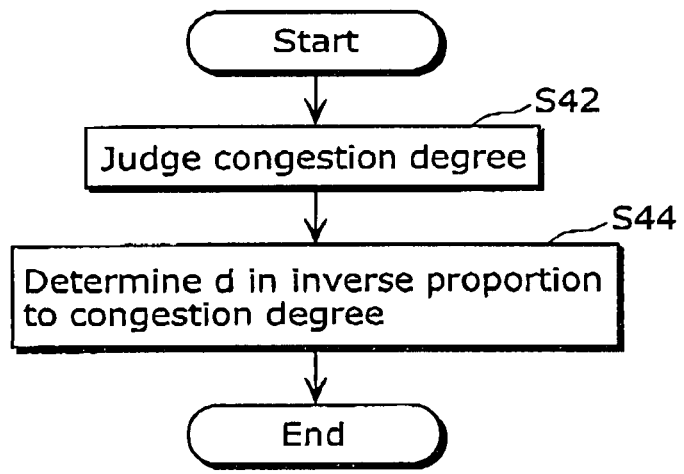
FIG. 27 is a flowchart showing a process of controlling the movement of the mobile robot based on the congestion degree of the surrounding environment.
Figure 28:
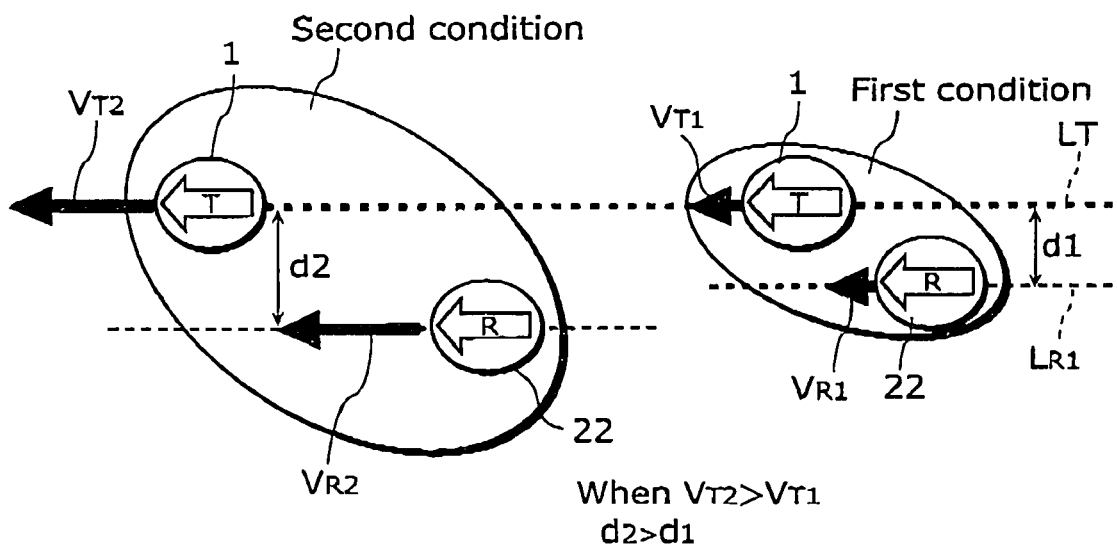
FIG. 28 is a diagram for explaining movement control of the mobile robot based on a velocity of the accompanied target.
Figure 29:
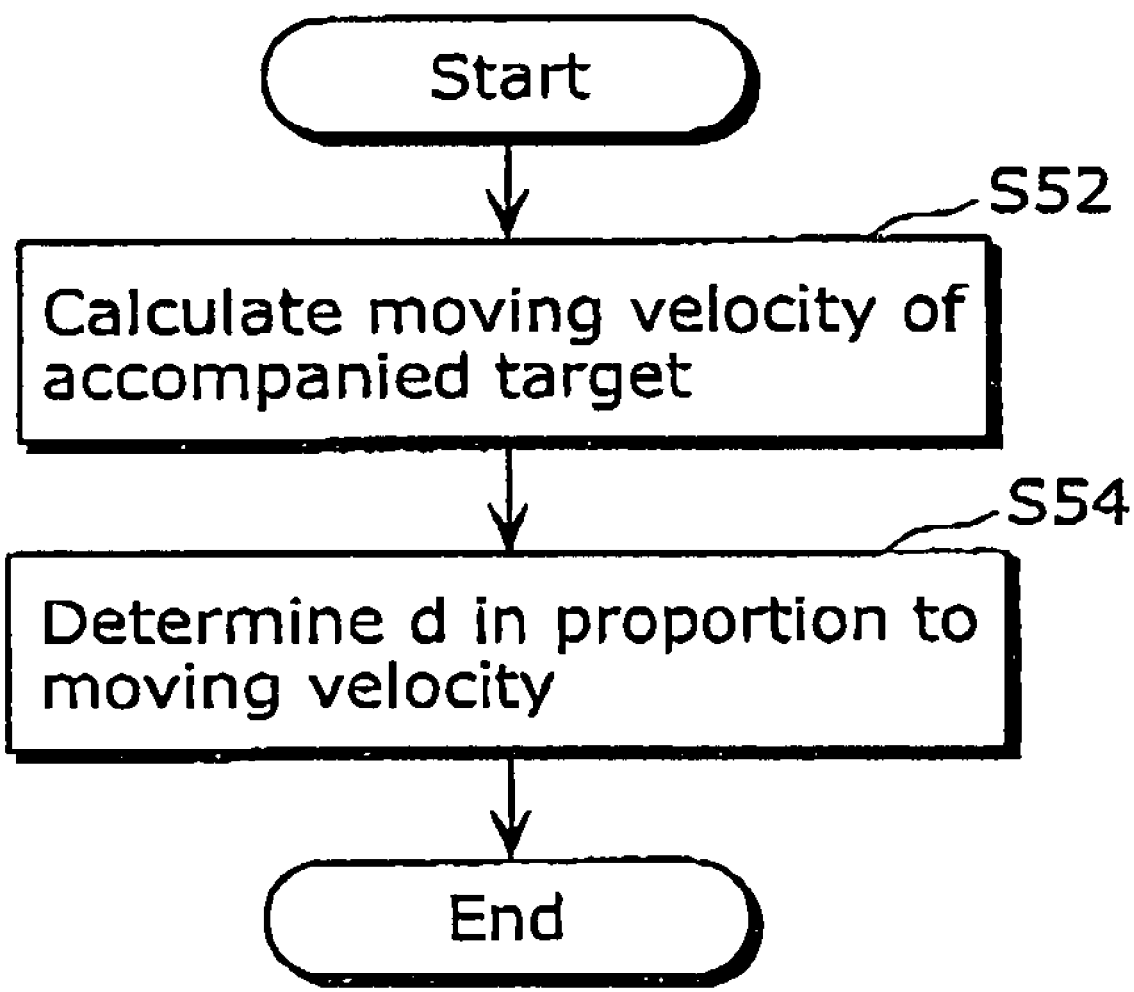
FIG. 29 is a flowchart showing a process of controlling the movement of the mobile robot based on the velocity of the accompanied target.

FIG. 24 to FIG. 29 are diagrams for explaining a change of an accompanying method due to a surrounding environment and the like in the mobile robot shown in FIG. 23. FIG. 24 and FIG. 25 are diagrams showing an example of changing a positional relationship by detecting an obstacle. FIG. 26 and FIG. 27 are diagrams showing an example of changing a positional relationship depending on the degree of congestion in the surrounding environment. Further, FIG. 28 and FIG. 29 are diagrams showing an example of changing a positional relationship depending on a velocity of the accompanied target.

The structure of the mobile robot 22 according to the second embodiment of the present invention shown in FIG. 23 includes a detecting apparatus 2h which detects a condition of a surrounding environment around the accompanied target 1 and the mobile robot 2, in addition to the structure of the mobile robot 2 of the first embodiment shown in FIG. 9. Further, in the mobile robot 22, the calculator 2f can change the distance d shifted toward right and left of the moving path of the accompanied target 1 and the positional relationship of the moving direction, based on the detection information from the detecting apparatus 2h.

Here, as the detecting apparatus 2h which detects a condition of the environment around the accompanied target 1 and the mobile robot 22, for example, the detecting device 2h functions as an obstacle detecting sensor using an ultrasonic sensor, an ultraviolet sensor and the like so as to detect a closeness condition to the obstacle, and the position for the mobile robot 22 to follow may be changed in order to avoid the obstacle. Further, the congestion degree of the surrounding environment is detected by a camera, a laser-range sensor and the like, and the distance d is changed depending on the congestion degree so that the mobile robot 2 may not be an obstacle when the environment is crowded.

Also, using the detecting apparatus 2h as a device for detecting a condition of the accompanied target 1 in addition to the aforementioned functions, the positional relationship may be changed depending on the velocity of the accompanied target 1. In addition, in the case where the detecting apparatus 2h is a camera, a gesture of the accompanied target 1 is detected by the camera, and visibility may be increased by positioning behind or to the side of the moving direction of the accompanied target 1 when the camera is about to recognize an accompanying condition.

FIG. 24 shows variations of the position and path of the mobile robot 22 and, in particular, a case where the positional relationship is changed by detecting the obstacle 52. For example, when the mobile robot 22, which follows the accompanied target 1 from diagonally behind as shown in the first condition, finds the obstacle 52 in front of the accompanying path $L_{R1}$, the mobile robot 22 avoids the obstacle 52 by making the distance d smaller so that it can hide behind the accompanied target 1 as shown in the second condition, and the mobile robot 22 changes the distance back to original amount after passing the obstacle 52 as shown in the third condition.

FIG. 25 is a flowchart of the aforementioned control movement process. In the case where the mobile robot 22 finds the obstacle 52 on the path $L_R$ to follow (YES in S32), the mobile robot 22 changes the distance d in order to avoid the obstacle 52 (S34). Note that, while the velocity of the mobile robot 22 automatically changes by changing the distance d, the velocity may be changed by intent. For example, the control may be performed in the following manner: the velocity is slowed down near the obstacle 52, and accelerated after passing the obstacle 52 so as to catch up with the accompanied target 1.

Further, FIG. 26 also shows a variation of the position and the path of the mobile robot 22, similar to FIG. 24, and, in particular, shows a case where the positional relationship is changed depending on the congestion degree of the environment around the mobile robot 22. For example, it is assumed that there are passers 53 and the like around the mobile robot 22. Here, the mobile robot 22 which follows with a large distance d from diagonally behind the accompanied target 1 in the case where the environment is not crowded as shown in the first condition, changes the positional relationship so as to make the distance d smaller when the environment becomes crowded with passers 53 as shown in the second condition, and reduces a probability of contacting the passers 53. Furthermore, the mobile robot 2 follows the accompanied target with an original large distance d when the crowds have disappeared as shown in the third condition.

Note that, the congestion degree herein may be the number of objects in a surrounding environment such as passers 53 in a predetermined range around the mobile robot 22, or may be defined by a ratio of an area dominated by the objects in the surrounding environment.

FIG. 27 is a flowchart of the aforementioned movement control process. In other words, the mobile robot 22 judges the congestion degree of the environment around the mobile robot 22 (S42), and determines the difference d so as to be proportionally inverse relative to the congestion degree (S44).

Further, FIG. 28 shows a variation of the position and path of the mobile robot 22 and the case where the positional relationship is changed depending on the velocity of the accompanied target 1. For example, in the case where the velocity $V_{T1}$ of the accompanied target 1 is small as shown in the first condition, the mobile robot 22 follows the accompanied target 1 while maintaining the small distance d1. However, when the velocity $V_{T2}$ of the accompanied target 1 is accelerated as shown in the second condition, the mobile robot 22 follows the accompanied target 1 so as to have a large distance d2 and the like. Thus, a probability of causing a collision depending on a rapid velocity change of the accompanied target 1 is reduced.

FIG. 29 is a flowchart of the aforementioned movement control process. In other words, the mobile robot 22 calculates a moving velocity of the accompanied target 1 (S52), and determines the distance d so as to be proportional to the moving velocity (S54).

Thus, the probability of causing a collision is small even when the mobile robot 22 approaches the accompanied target 1 in the case where the moving velocity of the accompanied target 1 is small, so that there is no problem of making the distance shorter. However, the moving velocity of the accompanied target becomes higher as the probability of causing a collision between the mobile robot 22 and the accompanied target 1 is higher. Therefore, it is necessary to make the distance larger so as to avoid the collision between them.

As described above, according to the present invention, the mobile robot can follow the accompanied target at the best accompanying position in accordance with the surrounding environment. Therefore, for example, in the cases where an obstacle is flexibly avoided, where the distance is adjusted in accordance with the congestion degree of the environment, or where the accompanied target is a person, the accompanying behavior can be performed having a positional relationship in accordance with the person's preference and a demand. Accordingly, the best accompanying behavior can be realized in a state where the mobile robot is placed.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

According to the present invention, a collision between an accompanied target and a mobile robot can be prevented even in the case where the accompanied target suddenly changes velocity. Also, an appropriate accompanying behavior to the accompanied target can be realized in accordance with a state of the accompanied target and an environment. Therefore, the present invention is applicable to an automatic cart and a transporting robot used at home, hotel, golf course, factory, airport and the like, to an automatic ride, a robot which provides a touring function, a robot which provides nursing care and the like.

What is claimed is:

1. A method of controlling movement of a mobile robot, said method comprising:
   detecting at least a position and a moving direction of an accompanied target; and
   controlling movement of the mobile robot, based on the detected position and the moving direction of the accompanied target, so that the mobile robot keeps following a path that is directed toward the same direction as the moving direction of the accompanied target and is parallel to the moving direction, wherein said controlling further includes:
   controlling movement of the mobile robot so that a distance between the accompanied target and the mobile robot becomes a predetermined distance,
   calculating the path along which the mobile robot moves, based on detected information of the accompanied target that is detected in said detecting;
   calculating a velocity of the mobile robot, based on the detected information of the accompanied target and a difference between a position of the mobile robot on the calculated path and a current position of the mobile robot; and
   controlling the mobile robot so that the mobile robot moves at the calculated velocity.

2. The method of controlling movement of the mobile robot according to claim 1,
   wherein in said calculating of the path, a target coordinate Pl on the path along which the mobile robot moves is calculated in accordance with the following equations (1) and (4), $$Pa = Pk + A*Vg \quad (1),$$

$$(Pl-Pg) \cdot Vg = L \quad (4)$$

where Pk is an arbitrary position vector in an arbitrary distance from a point on the moving path of the accompanied target, Vg is a unit vector of the velocity of the accompanied target, A is an arbitrary constant, Pg is a position vector of the accompanied target, and L is a predetermined distance between the accompanied target and the mobile robot along the moving direction of the accompanied target.

3. The method of controlling movement of the mobile robot according to claim 1.
   wherein in said calculating of the velocity, the velocity of the mobile robot is calculated in accordance with the following equations (5) and (3b), $$Vr = G1 \times |Vg| + G4 \times |Vg| \times dL \quad (5),$$

$$\omega r = -G2 \times d\theta - G3 \times dh \quad (3b)$$

where Vr is a velocity for moving toward a direction parallel to the path along which the mobile robot moves, Vg is a unit vector of the velocity of the accompanied target, $\omega r$ is an angular velocity of the mobile robot, $d\theta$ is an angular difference between a direction toward which the mobile robot faces and the direction of the path along which the mobile robot moves, dh is a distance between the mobile robot and the path along which the mobile robot moves, G1, G2, G3 and G4 are predetermined gains, and dL is a difference of a predetermined distance between the accompanied target and the mobile robot.

4. The method of controlling movement of the mobile robot according to claim 1,
   wherein said detecting further includes smoothing at least the detected position of the accompanied target.

5. The method of controlling movement of the mobile robot according to claim 1,
   wherein said controlling further includes estimating a continuous region having a constant width in a direction vertical to the path of the accompanied target, based on at least the position of the accompanied target, and keeping the moving path of the mobile robot while the accompanied target moves within the continuous region.

6. The method of controlling movement of the mobile robot according to claim 5,
   wherein said controlling further includes keeping the moving path of the mobile robot while the accompanied target moves within the continuous region and an angle between the moving direction of the accompanied target and the path of the accompanied target is within a predetermined range.

7. The method of controlling Movement of the mobile robot according to claim 5,
   wherein said controlling further includes stopping the mobile robot in the case where the velocity of the accompanied target is 0 and the distance between the accompanied target and the mobile robot is within a predetermined distance.

8. The method of controlling movement of the mobile robot according to claim 1,
   wherein said controlling further includes stopping the mobile robot in the case where it is detected that the moving direction of the accompanied target changes to a direction approaching the mobile robot.

9. The method of controlling movement of the mobile robot according to claim 8,
   wherein said controlling further includes re-starting the movement of the mobile robot in the case where it is judged that the accompanied target moves away from the stopped mobile robot.

10. The method of controlling movement of the mobile robot according to claim 1,
    wherein said controlling further includes causing the mobile robot to follow after the accompanied target in the case where an obstacle is detected in the moving direction of the mobile robot.

11. The method of controlling movement of the mobile robot according to claim 1,
    wherein said controlling further includes controlling movement of the mobile robot by making a distance between the accompanied target and the mobile robot shorter as a surrounding environment is more crowded.

12. The method of controlling movement of the mobile robot according to claim 1,
    wherein said controlling further includes determining a distance between the accompanied target and the mobile robot in proportion to the moving velocity of the accompanied target, and controlling movement of the mobile robot in accordance with the distance.

13. A method of controlling movement of a mobile robot, said method comprising:
- detecting a position and a moving direction of an accompanied target;
- calculating a path along which the mobile robot moves, based on the detected position and the moving direction of the accompanied target, the path being directed toward the same direction as the moving direction of the accompanied target and being parallel to the moving direction;
- calculating a velocity of the mobile robot, based on the detected velocity of the accompanied target and a difference between a position of the mobile robot on the calculated path and a current position of the mobile robot; and
- controlling the mobile robot so that the mobile robot moves at the calculated velocity while continuing to follow the calculated path along which the mobile robot moves, the path being directed toward the same direction as the moving direction of the accompanied target and being parallel to the moving direction.

14. The method of controlling movement of the mobile robot according to claim 13,
wherein in said calculating of the path, an arbitrary position vector Pa on the path along which the mobile robot moves is calculated in accordance with the following equations (1) and (2), $$Pa = Pk + A*Vg \quad (1),$$

$$|Pk - (Pg + ((Pk - Pg) \cdot Vg)Vg)| = K \quad (2)$$

where Pk is an arbitrary position vector positioned in an arbitrary distance K from a point on a moving path of the accompanied target, Vg is a unit vector of the velocity of the accompanied target, A is an arbitrary constant, and Pg is a position vector of the accompanied target.

15. The method of controlling movement of the mobile robot according to claim 13,
wherein in said calculating of the velocity, the velocity of the mobile robot is calculated in accordance with the following equations (3a) and (3b), $$Vr = G1 \times |Vg| \quad (3a),$$

$$\omega r = -G2 \times d\theta - G3 \times dh \quad (3b)$$

where Vr is a velocity for moving toward a direction parallel to the path along which the mobile robot moves, Vg is a unit vector of the velocity of the accompanied target, $\omega r$ is an angular velocity of the mobile robot, $d\theta$ is an angular difference between a direction toward which the mobile robot faces and the direction of the path along which the mobile robot moves, dh is a distance between the mobile robot and the path along which the mobile robot moves, and G1, G2 and G3 are predetermined gains.

16. A mobile robot that is an autonomous mobile robot, comprising:
- a mobile unit operable to move a mobile robot body;
- a measurement unit operable to measure a position and a moving direction of an accompanied target; and
- a control unit operable to control the mobile unit, based on the measured position and the moving direction of the accompanied target, so that the mobile unit keeps following a path that is directed toward the moving direction of the accompanied target and is parallel to the moving direction, wherein the control unit is further operable to:
- control movement of the mobile unit so that a distance between the accompanied target and the mobile robot becomes a predetermined distance,
- calculate the path along which the mobile unit moves, based on information from the measurement unit regarding the position and moving direction of the accompanied target;
- calculate a velocity of the mobile unit, based on a difference between the measured position of the mobile unit on the calculated path and a current position of the mobile unit; and
- control the mobile unit so that the mobile unit moves at the calculated velocity.

* * * * *